United States Patent
Jacobson

(10) Patent No.: US 7,028,259 B1
(45) Date of Patent: Apr. 11, 2006

(54) INTERACTIVE LEGAL CITATION CHECKER

(76) Inventor: Robert L. Jacobson, 1414 Laurel Ave., Apt. L301, Minneapolis, MN (US) 55403

(*) Notice: Subject to any disclaimer, the term of this patent is extended or adjusted under 35 U.S.C. 154(b) by 706 days.

(21) Appl. No.: 09/775,184

(22) Filed: Feb. 1, 2001

Related U.S. Application Data

(60) Provisional application No. 60/179,572, filed on Feb. 1, 2000.

(51) Int. Cl.
*G06F 17/24* (2006.01)
(52) U.S. Cl. .................................................... 715/531
(58) Field of Classification Search ................ 715/540, 715/530; 706/12
See application file for complete search history.

(56) References Cited

U.S. PATENT DOCUMENTS 5,608,625 A * 3/1997 Bailey ......................... 715/540
6,502,081 B1 * 12/2002 Wiltshire et al. ............. 706/12

OTHER PUBLICATIONS

Supnik, Paul D., "Getting Your Cites in Order" Los Angeles Lawyer Magazine (Jun. 1989).*
WestCiteLink FAQ, at http://www.westlaw.com/citelink/faq.wl (© 2003).*
LexisNexis Citation Tools 2003, at http://support.lexisnexis.com/CitationTools2003/record.asp?ArticleID=CitationTolls2003_default&Print1 (© 2005).*
Brochure: CiteRite™ For Windows®—Features Benefits, Lexis• Nexis, 2 pgs., not dated.
Website Print-Out: CiteRite™II, Lexis• Nexis, 3 pgs., Copyright 1999.
Website Print-Out: CiteRite™II, Product Description, Lexis• Nexis, 2 pgs., Copyright 2001.
Sample CiteRite Report, Lexis• Nexis, 10 pgs., not dated.
Website Print-Out: CompareRite Sample Printe, Lexis• Nexis, 12 pgs., Jan. 18, 2001.
Website Print-Out: CiteIt!—Legal Citation Made Simple!, Sidebar Software, Inc., 8 pgs., Copyright 1997-2001.
*Cite-It!- Legal Citation Made Simple*, User Manual, Sidebar Software, Inc., 74 pgs., Copyright 1997-2000.
Website Print-Out: WestCiteLink™ Overview, West Group, 38 pgs., Copyright 2001.
Brochure: *Add New Dimension to Your Documents with WestCiteLink™ 3.0*, West Group, 4 pgs., Copyright 2001.

(Continued)

*Primary Examiner*—Heather R. Herndon
*Assistant Examiner*—Doug Hutton
(74) *Attorney, Agent, or Firm*—Patterson, Thuente, Skaar & Christensen, P.A.

(57) ABSTRACT

A software utility scans a word processing document to locate citations to court opinions. It parses each citation to determine its constituent elements, such as the citation's case name, the reporters in which it is published, its jurisdiction and court, and its date. It then compares the citation as it is written against stylistic rules for legal citations. If it finds a deviation from one of the stylistic rules, it displays a message to inform the user of the error and, if possible, suggests specific changes to correct the error. If the user accepts one of the corrections, the utility makes that change to the word processing document.

52 Claims, 10 Drawing Sheets

OTHER PUBLICATIONS

Website Print-Out: *Getting Your Cites in Order*, Paul D. Supnik, 5 pgs., Sep. 27, 2000.

Website Print-Out: *Buyer's Guide to Corel WordPerfect Legal Suite*, Thomas L. Rowe, 4 pgs., Copyright 1998.

Website Print-Out: CiteRite™ 5.5 and 7.0, review, Law Office Computing Magazine, 1 pg., Aug. 31, 2000.

Website Print-Out: Law Office Software, BlumbergExcelsior, Inc., 2 pgs., Copyright 2000.

Manual: *Using WestCheck® Version 3.2 for Windows®*, West Group, 18 pgs., Copyright 1999.

Brochure: CheckCite™ 2000, Quick Reference, Lexis• Nexis, 1 pg., Copyright 1999.

Website Print-Out: expertEase™ Software, complete overview, 33 pgs., Aug. 3, 2001.

Website Print-Out: *Complex Document Proofing*, LexTech Inc., 2 pgs., Aug. 3, 2001.

Website Print-Out: *Entrepreneurs Invading Israel to Find Fortunes*, Jessica Steinberg, Forward, 3 pgs., Copyright 1998.

Website Print-Out: *Three Products to Watch Summer 1998*, Mark Rambler, Law Office Technology Review, 2 pgs., Copyright 1998.

Website Print-Out: *Beyond Spell Check* Aug./Sep. 1998, Richard Belthoff, Law Office Computing Magazine, 2 pgs., Copyright 1998.

Website Print-Out: *The Electronic Lawyer*, Alan Pearlman, Legal Tech Newsletter, 2 pgs., Copyright 1998.

Website Print-Out: *Avoiding Silly Drafting Errors with Deal Proof*, Barry Bayer, Benjamin H. Cohen, Law Office Technology Review, 3 pgs., Copyright 1998.

Website Print-Out: *Across Our Desk*, Bruce Brumberg, National Association of Stock Plan Professionals, vol. 6, No. 1, Mar. 1998.

Brochure: *Drafting with Deal Proof Team*, expertEase™ Software, 2 pgs., not dated.

Brochure: Deal Proof 3.0, expertEase™ Software, 14 pgs., not dated.

Website Print-Out: Deal Proof Tech Requirements, expertEase™ Software, 1 pg., Aug. 3, 2001.

*expertEase™ Software*, Technology White Paper, expertEase™ Software, 2 pgs., Copyright 1999-2001.

Website Print-Out: Legal Citation-overview, Oberon Development, 1 pg., Copyright 1998-2001.

Website Print-Out: Legal Citation-Introduction to the Basics, Oberon Development, 8 pgs., Copyright 2001.

Website Print-Out: Legal Citation-Sales Contacts/Pricing Information, Oberon Development, 2 pgs., Copyright 1999.

Manual: Citation-Legal Edition, Oberon Development Ltd., 80 pgs., Copyright 1999.

*A Swedish Grammar Checker*, J. Carlberger, R. Domeij, V. Kann, O. Knutsson, Royal Institute of Technology, Stockholm, Association for Computational Linguistics, Copyright 2000, pp. 1-8.

*Towards a Theory of Textual Errors*, F. R. Bustamante, T. Declerck, F. Sanchez Leon, Laboratorio de Linguistica Informatica, University of Madrid, Spain, 13 pgs., not dated.

*GramCheck: A Grammar and Style Checker*, F.R. Bustamante, F. Sanchez Leon, Escuela Politecnica Superior, University Carlos III de Madrid, Spain, 7 pgs., not dated.

*A Chart-Based Framework for Grammar Checking Initial Studies*, A. Sågvall Hein, Department of Linguistics, Uppsala University, Sweden, 12 pgs., not dated.

*Tips & Techniques for using the award wining suite of legal research products.*, Lexis-Nexis Research Software, 17 pgs.; Copyright 1997.

\* cited by examiner

INTERACTIVE LEGAL CITATION CHECKER

CLAIM TO PRIORITY

The present application claims priority to U.S. Provisional Patent Application having Application No. 60/179,572, filed Feb. 1, 2000, and entitled "Interactive Legal Citation Checker."

COPYRIGHT CLAIM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. No copyright is claimed to passages from *The Bluebook. A Uniform System of Citation*.

FIELD OF THE INVENTION

The invention relates to citations to case opinions that are typically found in legal writings and, more particularly, to an interactive system and method for locating and parsing the legal citations, for verifying the stylistic accuracy of the legal citations, and for displaying and implementing corrections of the legal citations.

BACKGROUND OF THE INVENTION

Legal citations to case opinions are typically found in legal writings. When attorneys write legal briefs and memoranda, when judges write legal opinions, and when law students and law professors write academic papers, the writings typically contain citations to legal sources, such as case opinions, statutes, and administrative regulations. When writing these citations, members of the United States legal profession must follow particular stylistic guidelines. Most are expected to follow the stylistic rules that are promulgated in a handbook called the *Bluebook: A Uniform System of Citation* ("the Bluebook").

According to the Bluebook stylistic rules, a typical case citation has the form "United States v. McDonald, 531 F.2d 196, 199–200 (4th Cir. 1976)". In this citation, "United States v. McDonald" represents the name of the case, "531 F.2d 196" represents volume 531, page 196 of the reporter Federal Reporter, Second Series, "199–200" represents the pinpoint page number to a specific passage, "4th Cir." represents the court that decided the opinion (the Federal Fourth Circuit Court of Appeals), and "1976" represents the year the opinion was decided. Case names are often underlined or italicized.

The Bluebook's rules are quite specific and complex. When adding a citation to a single court opinion, for example, the writer must adhere to 15 pages of general rules that potentially apply, and must also consult several lengthy tables for rules that are specific to that opinion's jurisdiction. Some of these rules differ depending on the context of the citation. Further, the rules for citations to opinions from one jurisdiction are often inconsistent with similar rules for those of another jurisdiction, so the writer must frequently consult the appropriate table to ensure that he or she is using the appropriate style for that jurisdiction.

Consequently, conscientious legal professionals must devote a considerable amount of time to ensuring that they have properly followed the Bluebook format. Since even the most careful professional, however, will likely make some errors that violate the Bluebook rules, a computer program that locates citations in a word processing document, checks those citations for stylistic accuracy, and suggests and implements corrections can provide a substantial benefit in improving accuracy and saving the user's time.

In addition, a computer program that locates citations in a document and parses their constituent components has other applications. For example, many legal briefs are required to have a "table of authorities," an index of each citation contained in a brief. Presently, word processing applications like Microsoft Word® have components that generate tables of authorities; however, these components require the user to mark each citation manually in the word processing document. A program that automatically locates and marks each citation in a document, such as the invention described herein, would help to improve the speed and accuracy of building tables of authorities.

DESCRIPTION OF THE PRIOR ART

At least one other software application, called "CiteRite™" and marketed by Reed Elsevier plc, checks word processing documents for Bluebook stylistic errors. This program has several limitations, however. First, the program operates as a separate stand-alone application. Unlike the present invention, which operates as a "plug in" that works from within a word processing application, a user of CiteRite™ must first close the word processing document and then launch the separate CiteRite™ application to check the document. Second, the program merely generates a written report that lists potential errors. Unlike the present invention, it does not suggest specific corrections and cannot edit the word processing document to implement those corrections. Rather, the user must review the report and manually make any corrections. According to Reed Elsevier marketing literature, CiteRite™ improved upon prior, unnamed cite-checking applications that were even more limited, as they required the user to "mark" each citation before the software could check it.

In addition, other software applications by Reed Elsevier and West Publishing, called "CheckCite™" and "WestCheck™," respectively, check citations for substantive, rather than stylistic, accuracy. These applications locate citations in a word processing document and compare them to cases contained in their electronic databases. They verify that the citations have the correct case name, correct reporters, correct page and volume numbers, accurate quotations, and so on. Like CiteRite™, they operate as stand-alone applications and merely generate written reports that list perceived discrepancies. Further, they do not attempt to check for stylistic accuracy; indeed, some of their suggestions are contrary to Bluebook stylistic rules.

Another program, "CiteIt™" by Sidebar Software, Inc., attempts to enforce stylistic accuracy through a different method: it requires a user to enter information about each constituent element of a legal citation (such as the case name, volume number, reporter abbreviation, etc.) into the fields of an electronic form. Based on this data, it generates a complete citation that it pastes into a word processing document. At the time it generates the citation, it performs certain tests for Bluebook stylistic accuracy on the constituent elements and suggests corrections, such as suggesting appropriate abbreviations for case names. The program is limited, however, in that it cannot locate or parse citations in a word processing document, and thus cannot identify errors or suggest corrections for citations after they have been entered into the word processing document. Rather, the program requires users to adapt to a new method for creating citations and works only with citations generated through this method.

SUMMARY OF THE INVENTION

The present invention is a legal citation software utility that preferably integrates with a word processing application as a "plug in"—that is, when installed, it integrates itself into the menu structure of the word processing application and operates while the word processing document remains open in the word processing application. It interacts with the user through dialog boxes that appear to originate from within the word processing application. Thus, from the user's perspective, the software utility behaves like a component of the word processing application itself, much like a spelling checker or word count utility, rather than a stand-alone application.

The user starts the legal citation software utility by selecting a menu command from the word processing application. The legal citation software utility then scans a word processing document to identify and parse citations. As it identifies each citation, it performs a series of tests to determine whether the citation conforms to stylistic rules. If it encounters an error, it displays the citation with the error highlighted, displays an error message, displays the relevant Bluebook rule, and typically displays one or more citations that incorporate a recommended/suggested correction. The user may then edit the citation manually, may reject the recommended correction or may accept the recommended correction. If the user selects a suggestion, the invention automatically edits the word processing document to incorporate the change selected by the user. The invention then continues to check that citation and other citations in the document until no further errors are encountered.

The legal citation software utility has five primary processes. First, it contains a component that permits the invention to integrate with a word processing application. Second, it contains a detailed data structure, or object model, that represents the various rules for each United States jurisdiction and court. Third, it has a component that scans a document for the constituent elements of citations and builds a data structure that represents each citation. Fourth, it has a component that tests each citation for specific errors. Fifth, it has a component that displays identified errors and suggestions, and edits the word processing document if a suggestion is accepted. The following briefly describes each of these processes.

1. Document Interface

The Document Interface integrates the invention with a word processing application. This component creates a data structure that represents the word processing document, including each word in the document. Other components of the legal citation software utility use the Document Interface to read the contents of, and make changes to, the word processing document.

2. Jurisdictions Object Model

The Jurisdictions Object Model is a hierarchical data structure that contains a representation of the specific Bluebook rules for each of the United States' jurisdictions. At the highest level of the hierarchy, it contains a representation of each of the 59 United States jurisdictions, representing the federal court system and the court system for each state and territory. Each jurisdiction, in turn, contains a representation of each particular court used in that jurisdiction. Each court contains a representation of information specific to that court, such as the reporters used by the court and the valid dates for cases from that court. Other components use the Jurisdictions Object Model to identify courts, jurisdictions and reporters in the document, to assess how they relate to one another, and to apply specific tests to determine whether the citation is formatted correctly.

3. Citation Model

The Citation Model is the component of the legal citation software utility that scans a document for elements of a citation and then parses the elements by building a data structure that represents each citation. The citation data structure consists of other data structures, called "clauses," that represent each of the elements of a typical citation: a case name, one or more citations to specific reporters, and identifications of the jurisdiction, court and date of the case.

The Citation Model begins by locating each clause in a passage of the word processing document. Many phrases are ambiguous, in that the same phrase may represent the name of a reporter, jurisdiction or court. When the component encounters such an ambiguity, it considers each possible interpretation and assigns a score representing how close that alternative comes to a correct, complete citation. It then selects the interpretation with the highest score as being the most likely interpretation of the citation. After the Citation Model has identified the best interpretation of a citation, it passes a data structure representing this citation to other components.

4. Check Modules

The Check Modules are a set of components within the legal citation software utility that perform a series of tests on each citation data structure. In summary, the components perform the following tests:

One Module checks the case name clause to ensure it conforms to Bluebook rules for the formatting and style of case names.

One Module checks each reporter clause to ensure that the reporter has the correct abbreviation and other formatting, such as a volume number and page number.

One Module checks whether each reporter clause has a designation of the reporter's editor, if necessary, and whether that designation is formatted correctly.

One Module checks the jurisdiction clause and court clause to determine whether these clauses are abbreviated correctly and whether or not they are necessary.

One Module checks the date clause to determine whether it is formatted correctly and whether the year is valid for the court.

One Module checks whether the citation has the necessary reporter or reporters for its court.

One Module checks whether the citation's clauses are in the correct order and whether the correct punctuation is used between the clauses.

5. Error Form

When a Check Module identifies an error, it calls the Error Form, a module within the legal citation software utility that displays the problematic citation and implements suggestions. The Error Form displays a dialog box, or window, that appears on top of the word processing document. That dialog box displays the citation with the error highlighted, an error message explaining the error and the options the user has to correct it, and the text of the Bluebook rule that applies to this error.

In addition, the Check Module may instruct the Error Form to display one or more specific suggestions. If so, the Error Form generates and displays citations that contain the suggestions.

After displaying the error, the Error Form gives the user the option of accepting one of the corrected citations, of manually editing the citation in the word processor to eliminate the error, or of ignoring the error. If the user accepts one of the suggestions, the module edits the text of the word processing document itself, through the Document Interface, to incorporate that change.

APPENDIX

An appendix containing a printed program listing of the present invention is provided following the claims and abstract of the application.

DETAILED DESCRIPTION OF THE PREFERRED EMBODIMENTS

A legal citation software utility of the present invention when implemented within an existing word processing application operates to locate legal citations within a word processing document. The software utility then proceeds to verify the stylistic accuracy of those legal citations according to established standards while providing the user the opportunity to correct stylistic errors within the word processing document.

I. Basic Operation

Figure 1:
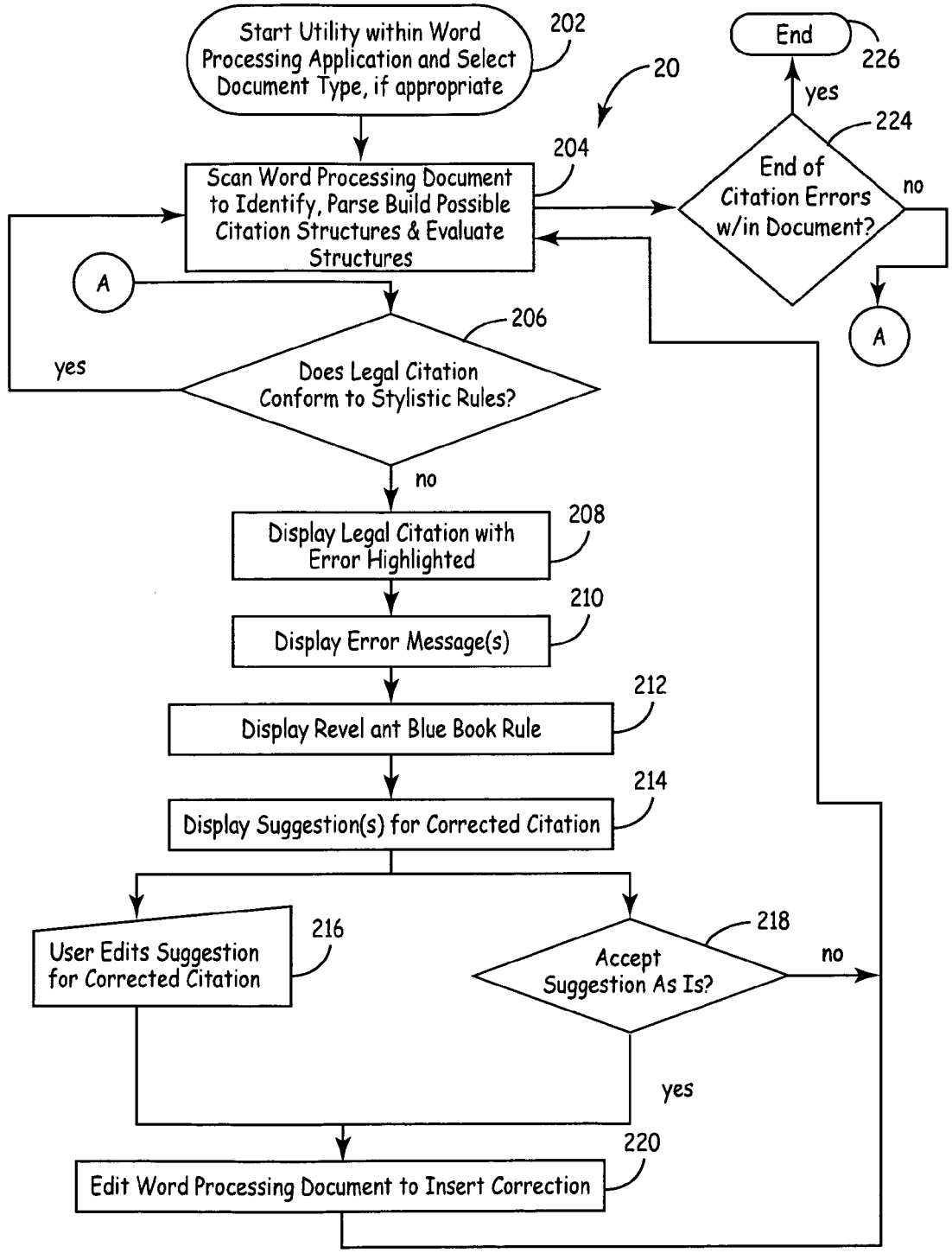
FIG. 1 is a flowchart depicting the basic, overall operation of the legal citation software utility of the present invention.

Referring to FIG. 1, a flowchart depicting the basic operation of the legal citation software utility 20 of the present invention is provided. It should be noted that the flowchart is provided as a tool in understanding the basic operation of the software utility 20; the sequence of steps in the operation of the software utility 20 may be utilized in any appropriate order to achieve the desired stylistic review of legal citations without departing from the spirit or scope of the invention. For example, the sequence of operational steps may occur in an altered order, may occur in a manner such that some operational steps are simultaneous with other operational steps, or may include additional steps as desired.

As shown, per block 202, the software utility 20 is activated within a running word processing application. Then, per operations block 204, the software utility 20 scans the word processing document to detect elements of the legal citations within the document. If no elements of legal citations are detected, per decision block 224, operation of the software utility 20 is terminated, per block 226. However, upon detecting elements of a legal citation, the software utility 20 parses the legal citation into possible citation structures, and evaluates the structures to determine which legal citation structure is most likely correct. The software utility 20 then checks the legal citation to determine if it conforms to established stylistic rules, such as those of the Bluebook, per decision block 206. It should be noted that the Bluebook is described herein as the chosen standard for stylistic rules, however, other standards for stylistic rules may be implemented within the software utility 20 without departing from the spirit or scope of the invention.

If the legal citation conforms to the stylistic rules, the software utility scans the word processing document for the next occurrence of an element of a legal citation, per operations block 204. If the legal citation structure does not conform to stylistic rules, the legal citation is displayed to the user with the portion of the citation containing an error highlighted in red, per operations block 208. Of course, other manners of highlighting an error may be used without departing from the spirit or scope of the invention. Additionally, one or more error messages describing the stylistic error are displayed to the user, per operations block 210, as is the relevant stylistic rule, per operations block 212. Further, typically one or more suggestions as to the correct format of the citation are provided, per operations block 214.

Upon receiving suggestions for correction, the user may input their own correction or edit the suggested correction, per input block 216. Alternatively, the user may accept the suggestion for correction as is, per decision block 218. In the instance the user inputs their own correction, edits the suggested correction, or accepts the suggestion for correction as is, the software utility 20 operates to directly edit the word processing document and implements the correction, per operations block 220.

Upon implementing the correction within the word processing document the software utility 20, the software utility 20 reparses the citation and checks it against all stylistic rules, following the flow of the flowchart of FIG. 1 once again by returning to operations block 204. If no further legal citations are detected within the word processing document, per decision block 224, the operation of the software utility 20 is terminated, per block 226.

Figure 2:
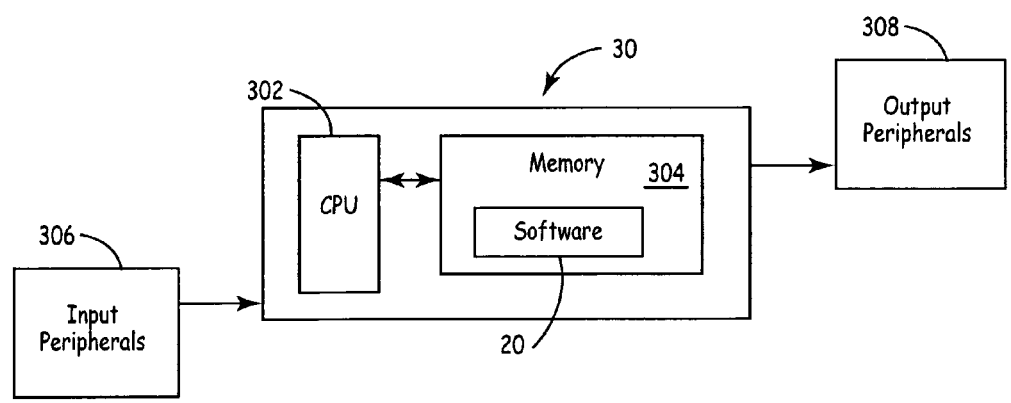
FIG. 2 is a block diagram of one example of a hardware configuration that may be used to implement the legal citation software utility of the present invention.

The operation as described above is preferably implemented through a program operating on a personal computer. Specifically, the legal citation software utility 20 of the present invention is preferably a program that is created with the Visual Basic 6.0™, Professional Edition programming language. It preferably operates on a personal computer running Microsoft Windows® 95, 98 or 2000. An example hardware configuration that may be used to implement the software utility 20 is shown in FIG. 2. As indicated the hardware includes a personal computer 30 having a central processing unit 302, memory 304 for storing the software utility 20 and the word processing application, as well as various input peripherals 306, e.g., keyboard, mouse, disk drives, external memory, internet connection etc., and various output peripherals 308, e.g., monitor, printer, disk drives, external memory, internet connection, etc. Of course, other hardware implementations, programming languages, and operating platforms may be used without departing from the spirit or scope of the invention.

When installed utilizing the above identified programming language and operating platform, the legal citation software utility 20 preferably operates as a "plug in" to the word processing applications encompassed within Microsoft Word® 97 and Microsoft Word® 2000 (collectively, "Microsoft Word®.") That is, the software utility 20 functions as a component of the word processing application, rather than as a separate stand-alone application. The software utility's code can be run either as uncompiled code directly from the Visual Basic™ 6 Editor or as a set of compiled DLL type libraries. The software utility 20 integrates with Microsoft Word® through Microsoft's Component Object Model, or "ActiveX™," technology. Data structures are created through object-oriented techniques using standard and custom object classes.

Figure 3A:
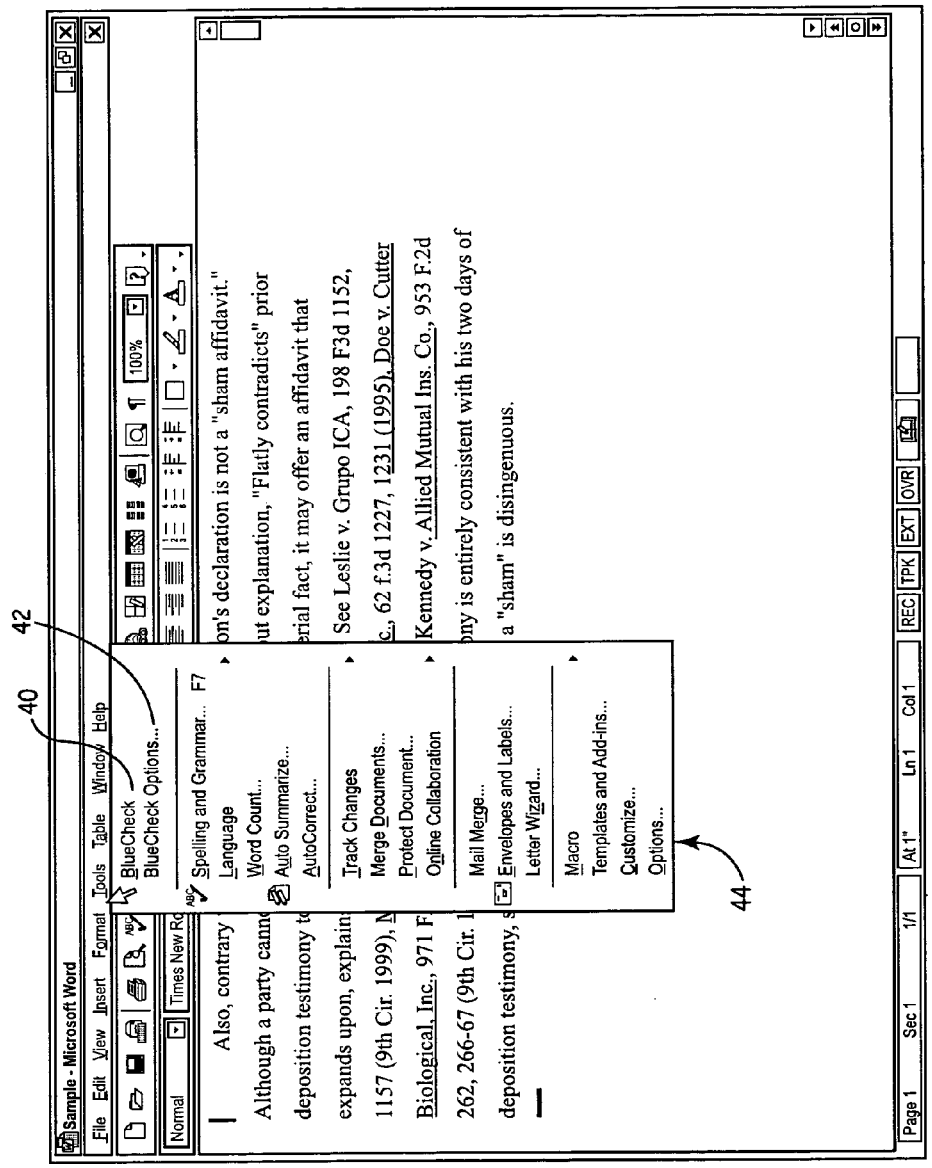
FIG. 3A depicts the menu commands that are added by the software utility of the present invention to a word processing application menu.
Figure 3B:
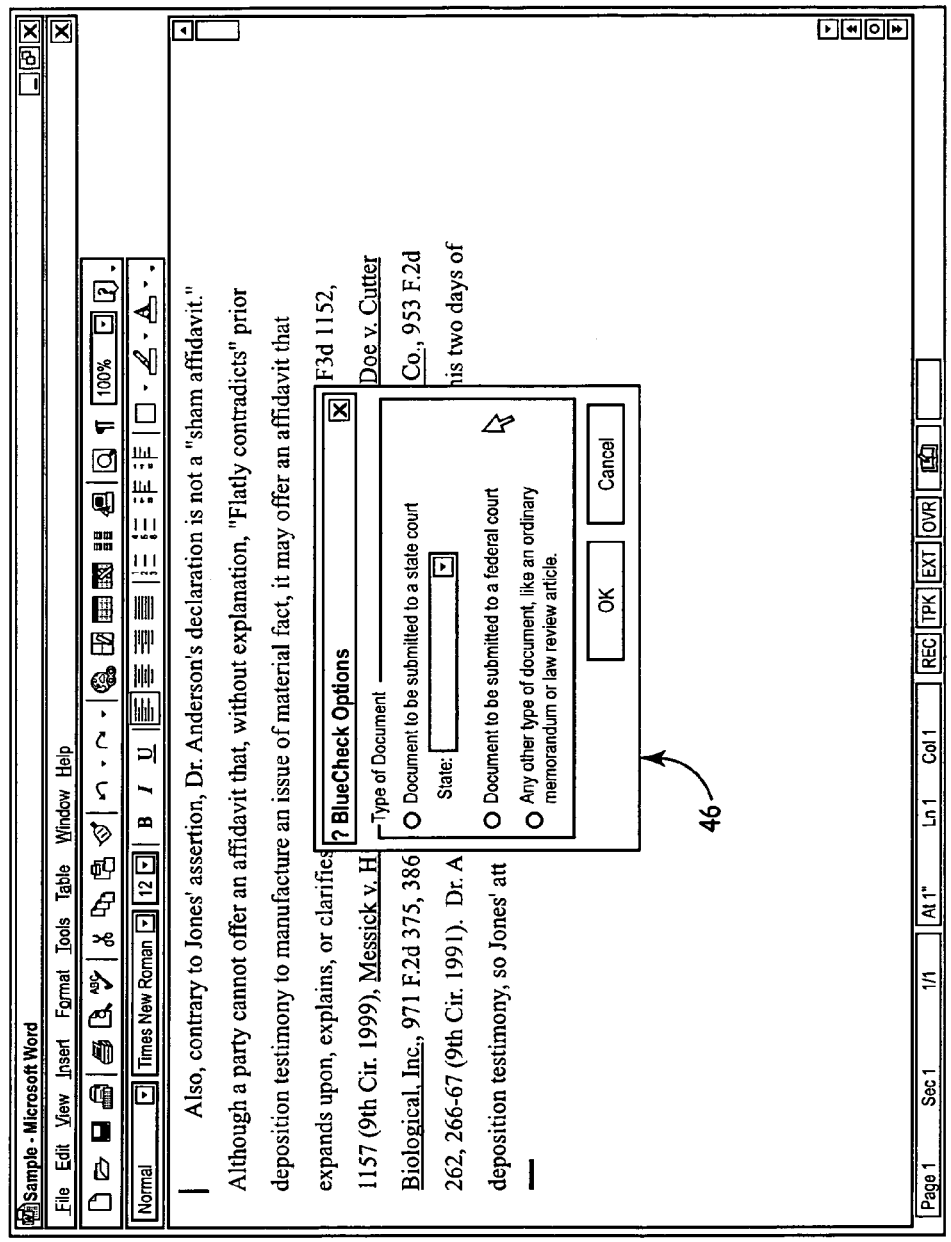
FIG. 3B depicts a dialog box that may be utilized by the software utility of the present invention to determine the type of legal document that will be reviewed by the software utility.

When the preferred embodiment of the software utility 20 is installed it preferably displays its operation to the user through menu commands and dialog boxes that appear over the existing word processing document. Specifically, the software utility preferably adds two menu commands, in this instance entitled "BlueCheck™" 40 and "BlueCheck Options™" 42, to Microsoft Word's® menu structure 44, see FIG. 3A. The user begins the main operation of the preferred embodiment by selecting the "BlueCheck™" menu command 40. If the user has not previously selected the "BlueCheck Options™" menu command 42 for the present word processor document, the program displays the BlueCheck Options™ dialog box 46, FIG. 3B. In the BlueCheck Options™ dialog box 46, the user is requested to set certain options that affect the stylistic tests that will be performed on the legal citations within the word processing document. Specifically, the user is requested to enter whether the word processing document is to be submitted to a state court and, if so, which state, a federal court, or whether it is a non-court document, e.g., memorandum or law review article.

Figure 3C:
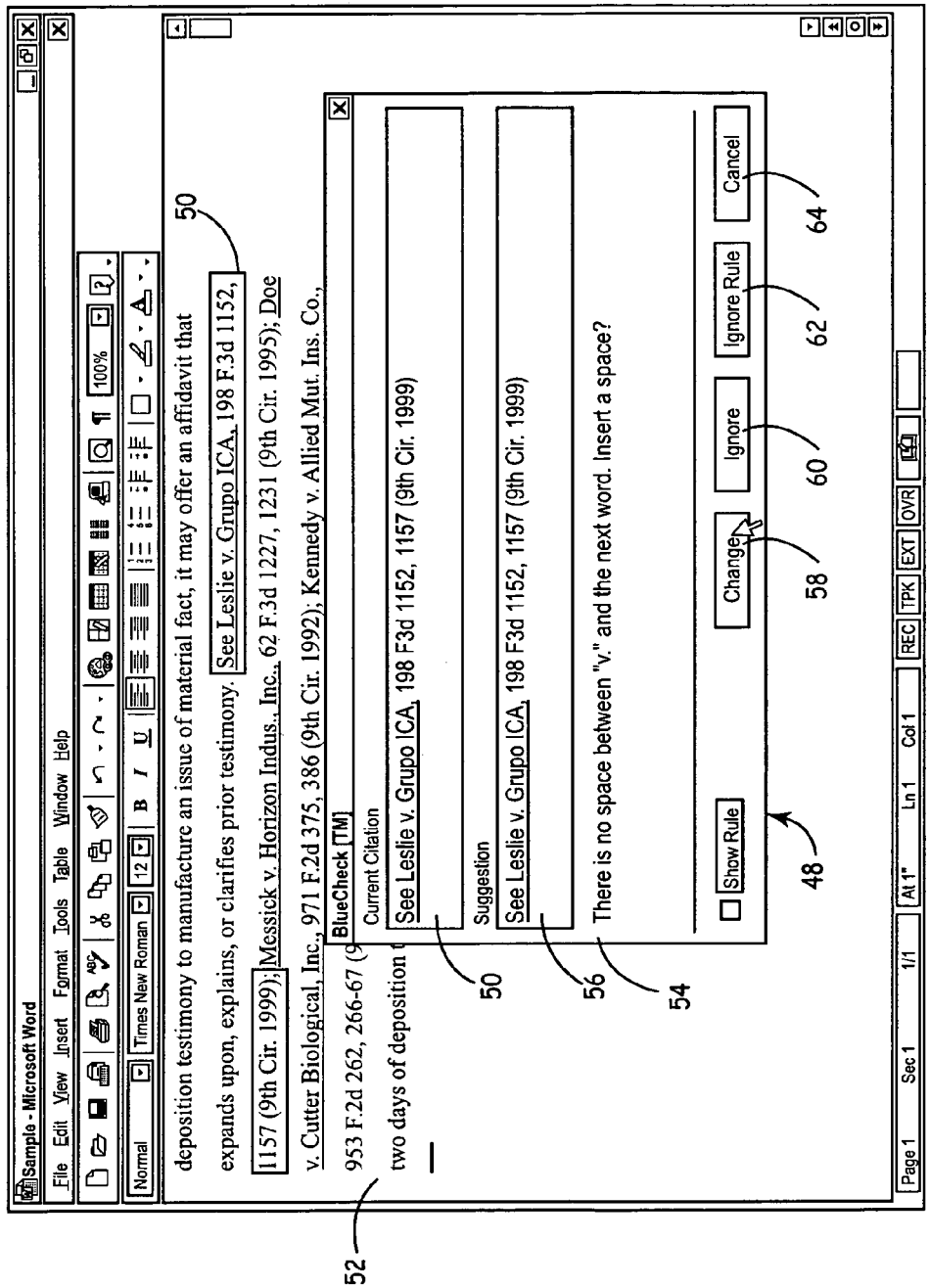
FIG. 3C depicts an error form dialog box that may be utilized by the software utility of the present invention to display error messages and suggestions for correction to the user of the software utility.

After closing the BlueCheck Options™ dialog box 46, the BlueCheck Error Form™ 48 is displayed, see FIG. 3C. When the preferred embodiment identifies a perceived error, it highlights the citation 50 in the Microsoft Word® document 52 and displays the current citation 50 in the Error Form 48, with the error highlighted and with a message 54 explaining the error. In most instances, the software utility 20 also makes a specific suggestion; if so, it displays the citation 56 as it will appear if the user selects the suggested change.

Upon displaying a suggestion, the user is preferably presented with at least four options. In this instance the options are indicated by four buttons within the Error Form 48, i.e., "Change" 58, "Ignore" 60, "Ignore Rule" 62, and "Cancel" 64. If the user selects the "Change" button 58, the software utility 20 incorporates that change within the word processing document 52 and looks for other errors in that citation. If the user selects the "Ignore" button 60, the suggestion is ignored and the software utility continues to review the citation 50 for further errors. If the user selects the "Ignore Rule" button 62, the error cited will be ignored for all subsequent citations containing the same error. If the user selects the "Cancel" button 64, the software utility 20 is stopped from further error checking.

Figure 3D:
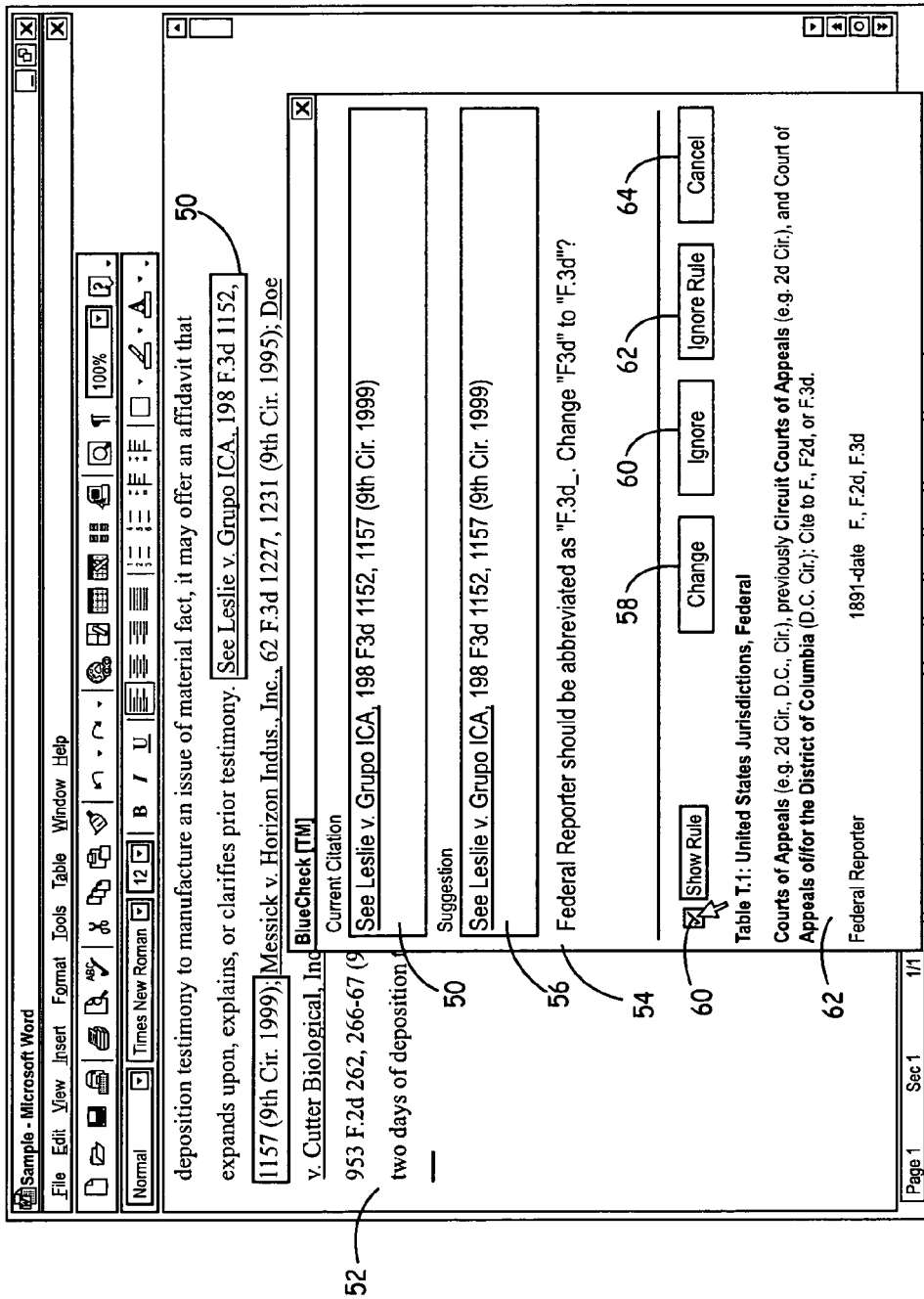
FIG. 3D depicts a drop-down box that may be utilized within the error form of FIG. 3C to provide a user with a listing of the relevant stylize rule that is applicable to the current error detected.
Figure 3E:
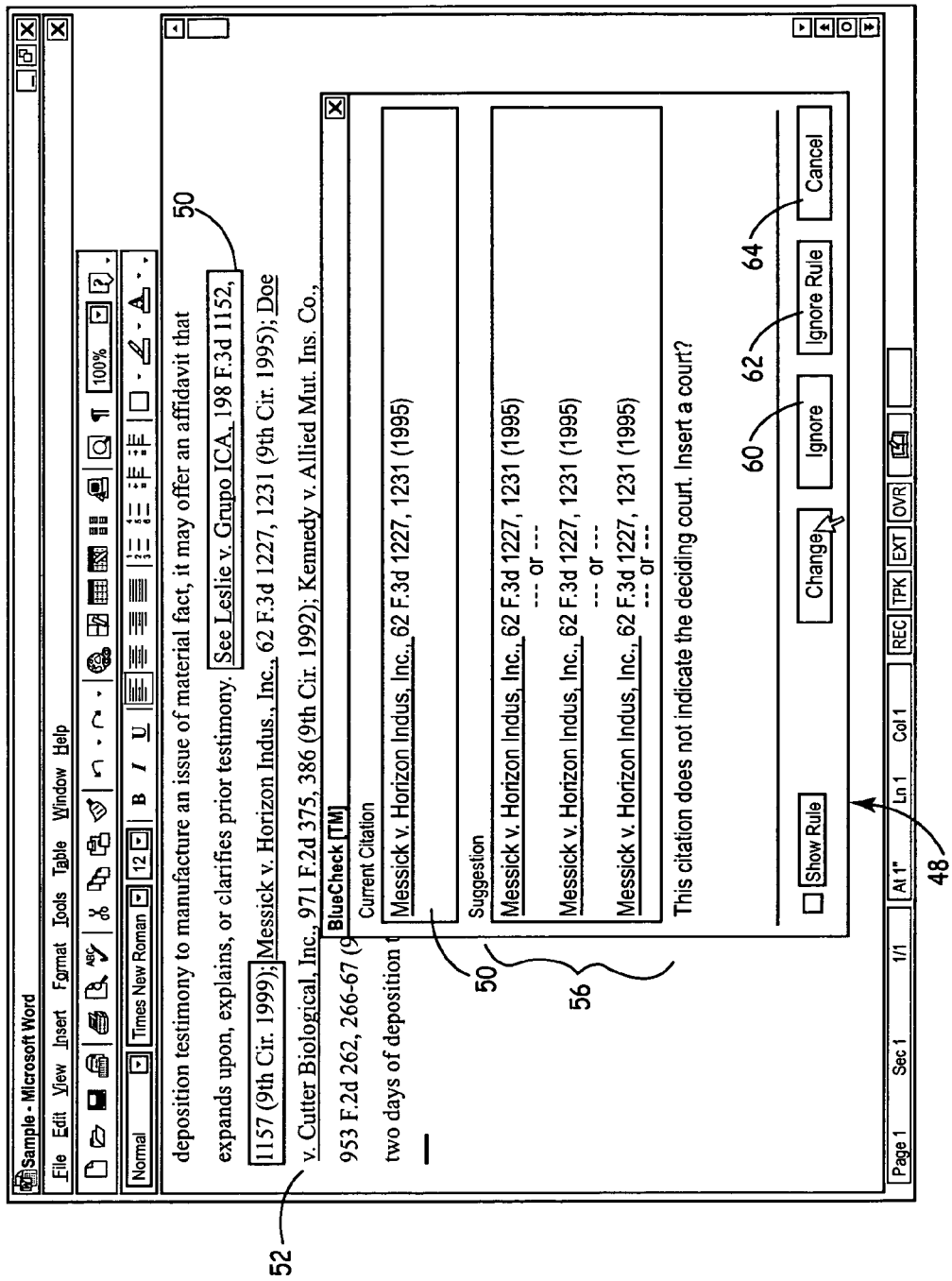
FIG. 3E depicts the error form dialog box wherein the software utility of the present invention has provided the user with more than one suggestion for correction.
Figure 3F:
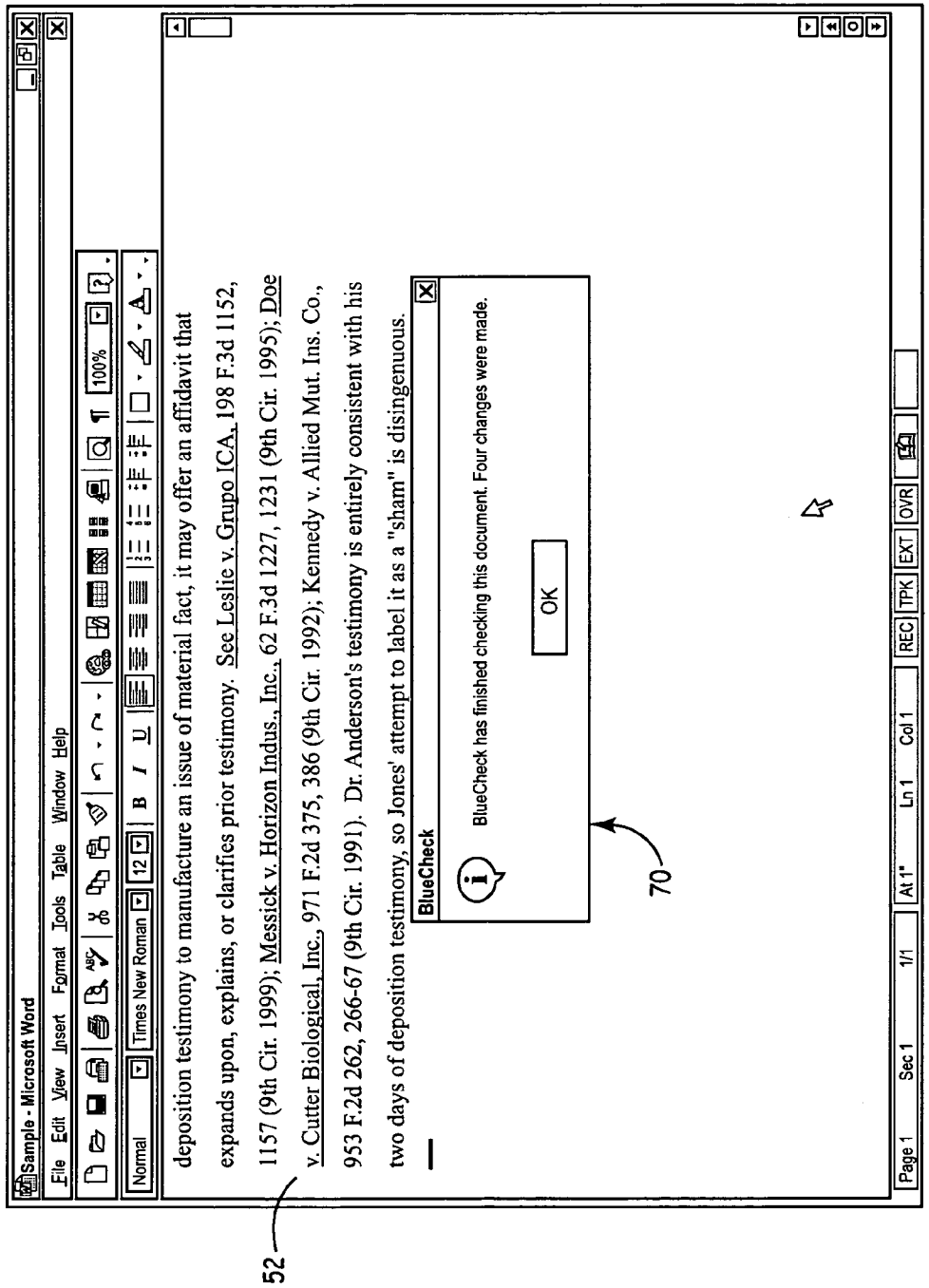
FIG. 3F is a summary dialog box that may be utilized by the software utility of the present invention to notify the user of the number of changes that were made to legal citations within a word processing document.

In some instances, it may identify more than one possible change. If so, the preferred embodiment displays a list of citations 56, each of which contains one change, see FIG. 3E. The user may select the appropriate change by clicking on the preferred suggestion. The software utility continues to check for other errors in that citation 50 and subsequent citations. When the software utility 20 has checked every citation 50 in the document 52 and can identify no further errors, it preferably provides an indication of the number of changes made to the document 52. In this instance, the software utility 20 displays a dialog box 70 that specifies the number of changes made, see FIG. 3F.

The user is also preferably presented with the option of viewing the relevant stylistic rule. In this instance, if the user wishes to see more information about an error message, he or she may view the text of the relevant Bluebook rule by selecting the "Show Rule" checkbox 66. Upon selecting the checkbox 66, a drop-down window 68 is provided within the Error Form 48 wherein the relevant rule is displayed, see FIG. 3D. When the software utility 20 has completed checking one citation, it then checks subsequent citations.

It should be noted that while the above-described menu commands and dialog boxes are the preferred manner of interacting with a user of the software utility 20, numerous other manners of interacting with a user may be utilized without departing from the spirit or scope of the invention.

II. Detailed Operation

The legal citation software utility 20 of the present invention utilizes five primary processes to achieve the operation described by the flowchart, menu commands, and dialog boxes described above. First, it contains a component that permits the invention to integrate with a word processing application, i.e., the Document Interface. Second, it contains a detailed data structure, or object model, that represents the various rules for each United States jurisdiction and court, i.e., the Jurisdictions Object Model. Third, it has a component that scans a document for the constituent elements of citations and builds a data structure that represents each citation, i.e., the Citation Model. Fourth, it has a component that tests each citation for specific errors, i.e., the Check Modules. Fifth, it has a component that displays identified errors and suggestions, and edits the word processing document if a suggestion is accepted, i.e., the Error Form. The following describes each of these processes in detail utilizing references to the written code of the software utility 20 as coded in Visual Basic™ 6.0, Professional Edition.

II.A. Document Interface

The Document Interface is a set of code that functions as an intermediary between the active Microsoft Word® document (the "document") and the other components of the software utility 20. The Document Interface creates a data structure that represents each document being used by the software utility 20. In addition to the active word processing document (the document being edited by the user), the Document Interface also allows other components to create other word processing documents. For example, the Error Form component uses the Document Interface to create a new "hidden" document, invisible to the user, that it uses to generate suggestions.

When the Document Interface creates a document data structure, it also creates a text data structure, the Words Interface, that provides an interface for reading and editing the text in that document. The Words Interface reads the text in the document and parses the text into individual constituent words. As an illustration, assume that the word processing document consists of the following passage:

> Once a plaintiff establishes a prima facie case of Title VII discrimination through a disparate impact, the defendant must articulate a reasonable business justification for the practice. See Wards Cove Packing Co. v. Atonio, 490 U.S. 642, 659–60 (1989).

The Words Interface parses this text into a series of individual words: "Once" "a" "plaintiff" "establishes," etc. The Words Component parses this text according to non-standard rules; for example, punctuation marks are treated as separate words. Thus, the phrase "U.S." consists of four words: the two letters and the two periods.

Other software utility components use the Words Interface to read and write to the individual words of the document. For example, the code "Text=ActiveDoc.Words(1, 3)" will set the variable Text to the first three words of the document ("Once a plaintiff".)

Likewise, a component may use the Words Interface to change the text in the word processing document. For example, the code "ActiveDoc.Words(1,1)="After" "changes the first word in the word processing document ("Once") to "After."

The Words Interface allows other components to access and set other information about individual words or phrases, such as how the text is formatted (whether it is bold, italicized or underlined), and the text's Rich Text Format formatting codes. It also allows other components to delete or insert ranges of text.

II.B. Jurisdictions Object Model

Figure 4:
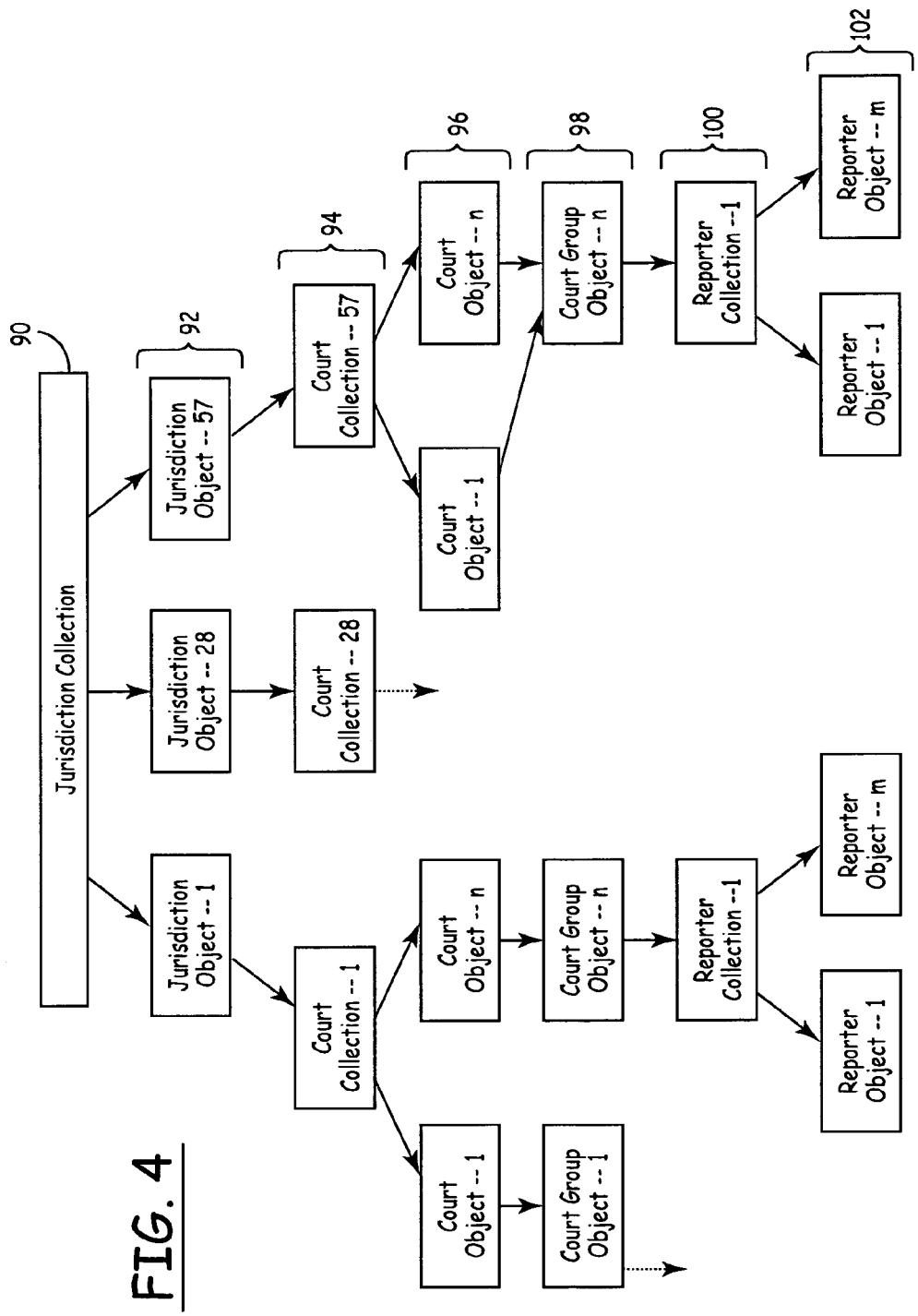
FIG. 4 depicts the hierarchical data structure utilized by the Jurisdictions Object Model component of the legal citation software utility of the present invention.

The Jurisdictions Object Model represents the Bluebook rules that are unique to each United States jurisdiction, such as the name and abbreviation of each jurisdiction and court and the reporters used by each court. The Jurisdictions Object Model represents this information through a hierarchical object-oriented data structure, as shown in FIG. 4.

The top level of the Jurisdictions Object Model is the Jurisdictions Collection 90, a custom collection class. The Jurisdictions Collection 90 contains 57 individual Jurisdiction Objects 92, one for each of the United States jurisdictions listed in Table T.1 of the Bluebook. Each Jurisdiction Object 92 contains specific information about that jurisdiction, such as its full name, its abbreviated name, and the courts and reporters used by that jurisdiction.

Each Jurisdiction Object 92 contains a Courts Collection 94, a custom collection class. The Courts Collection 94 contains the individual Court Objects 96 for that jurisdiction. Each Court Object 96 contains specific information about one court, such as the full name of the court, the correct abbreviation for that court, the range of valid years for that court, and the Court Group Object 98 associated with that court.

The Court Group Objects 98 summarize data about reporters. This data is often common to several related courts. For example, Table T.1 of the Bluebook lists three related federal courts, the United States Court of Federal claims, the United States claims Court, and the Court of claims. Each of these courts shares the same list of valid reporters. The Jurisdictions Object Model represents this list of reporters as a single Court Group Object 98. Each Court Object 96 for these three federal courts shares a single Court Group Object 98, rather than having a redundant list of reporters for each court. Specifically, the Court Group Object 98 contains a Reporter Collection 100 that represents each of the reporters used by these courts, along with data summarizing the rules governing the use of parallel and non-parallel citations for these courts.

Each Reporters Collection 100 is a custom collection that contains the individual Reporter Objects 102 used by a particular group of courts. Each Reporter Object 102 contains several types of data about a particular reporter. First, it includes the range of valid volume numbers for the reporter, the range of valid dates for the reporter, and the full name and correct abbreviation for the reporter. Second, it specifies whether the reporter identifies the court or jurisdiction of the citation. For example, the reporter United States Reports identifies the jurisdiction (federal) and court (Supreme Court) of a citation, while the regional reporter North Western Reporter identifies neither. Third, it identifies each editor used by the main reporter. For example, the Reporter Object for United States Reports identifies Wallace, Black, Howard, Peters, Wheaton, Cranch and Dallas as editors.

The Jurisdictions Object Model is initialized when it is first used. The data about each jurisdiction and court is loaded through subroutines in the Populate Jurisdictions module, which creates individual jurisdiction objects, court objects, and court group objects, gets their individual properties to the correct values, and places them in the appropriate jurisdictions or courts collection. The data about each reporter is loaded from a file on the user's hard drive through the Load Reporters module, which uses data contained in the file to create individual reporter objects, sets their individual properties to the correct values, and places them in the correct reporters collection.

The Jurisdictions Collection, Courts Collection and Reporters Collection each uses a similar subroutine, the Item method, to identify whether a particular phrase is a recognized jurisdiction, court or reporter. For example, the code Set Jur=Jurisdictions.Item(Phrase, True, True)

sets the variable Jur to a Jurisdiction Object that matches the string contained in the variable Phrase, if there is such a match. If Phrase contains "Minn.," for example, it would set the Jur variable to the Jurisdiction Object for Minnesota. Likewise, the code Set Court=Jurisdictions.Item("Minn.", True, True). Courts.Item(Phrase, True, True)

sets the variable Court to the Minnesota court that matches the string contained in the variable Phrase, if any. If Phrase contains "Ct. App.," it will set Court to the Court Object for the Minnesota Court of Appeals.

One problem with identifying and parsing citations in a document is that a program must be able to correctly interpret a citation even if the citation contains errors, including typographical errors. For example, the Bluebook instructs that Minnesota should be abbreviated as "Minn.," but users may omit punctuation (e.g., "Minn"), may use incorrect capitalization (e.g., "MInn."), may incorrectly use the postal abbreviation ("MN") or the unabbreviated name, or may misspell it altogether (e.g., "Mnn."). Likewise, although the Bluebook instructs that users should refer to the Minnesota Court of Appeals as "Ct. App.," writers often misspell it as "App. Ct." or simply "App." Thus, if a program merely searches a word processing document for the correct abbreviations, it would overlook many phrases that incorrectly identify a jurisdiction, court or reporter.

To overcome this problem, the Jurisdictions Model uses fuzzy pattern matching techniques to be more fault-tolerant. The Item method of the Jurisdictions Collection, Courts Collection and Reporters Collection each use a custom class called the Fuzzy Collection that uses a variety of techniques to identify close, but inexact, matches.

First, the Fuzzy Collection ignores punctuation and capitalization of the phrase. Thus, the above examples would return the Minnesota Jurisdictions Object for "MINN.," and would return the Minnesota Court of Appeals Court Object for "ctapp."

Second, the Fuzzy Collection not only looks for the correct abbreviation, like "Ct. App." or "Minn.," but also for "aliases"—phrases, like "App.," "App. Ct.," "MN," or "Minnesota," that are common misspellings of an expected phrase.

Third, the Fuzzy Collection uses an edit distance algorithm to identify other typographical errors. The edit distance algorithm will identify one string as being equivalent if it begins with the same character as the correct abbreviation or the alias and has no more than one character in difference. Thus, it will identify "Ct. Ap." or "Ct. Appp." as representing the Court of Appeals.

The Fuzzy Collection combines all of these techniques when searching for a jurisdiction, court or reporter that matches a phrase. Thus, it will return Minnesota as a jurisdiction from the phrase "min" even though the punctuation is wrong, the capitalization is wrong, and the phrase is misspelled, and will return the Court of Appeals for "Ap. Ct." even though the phrase is a misspelling of an alias.

II.C. Citation Model

Figure 5:
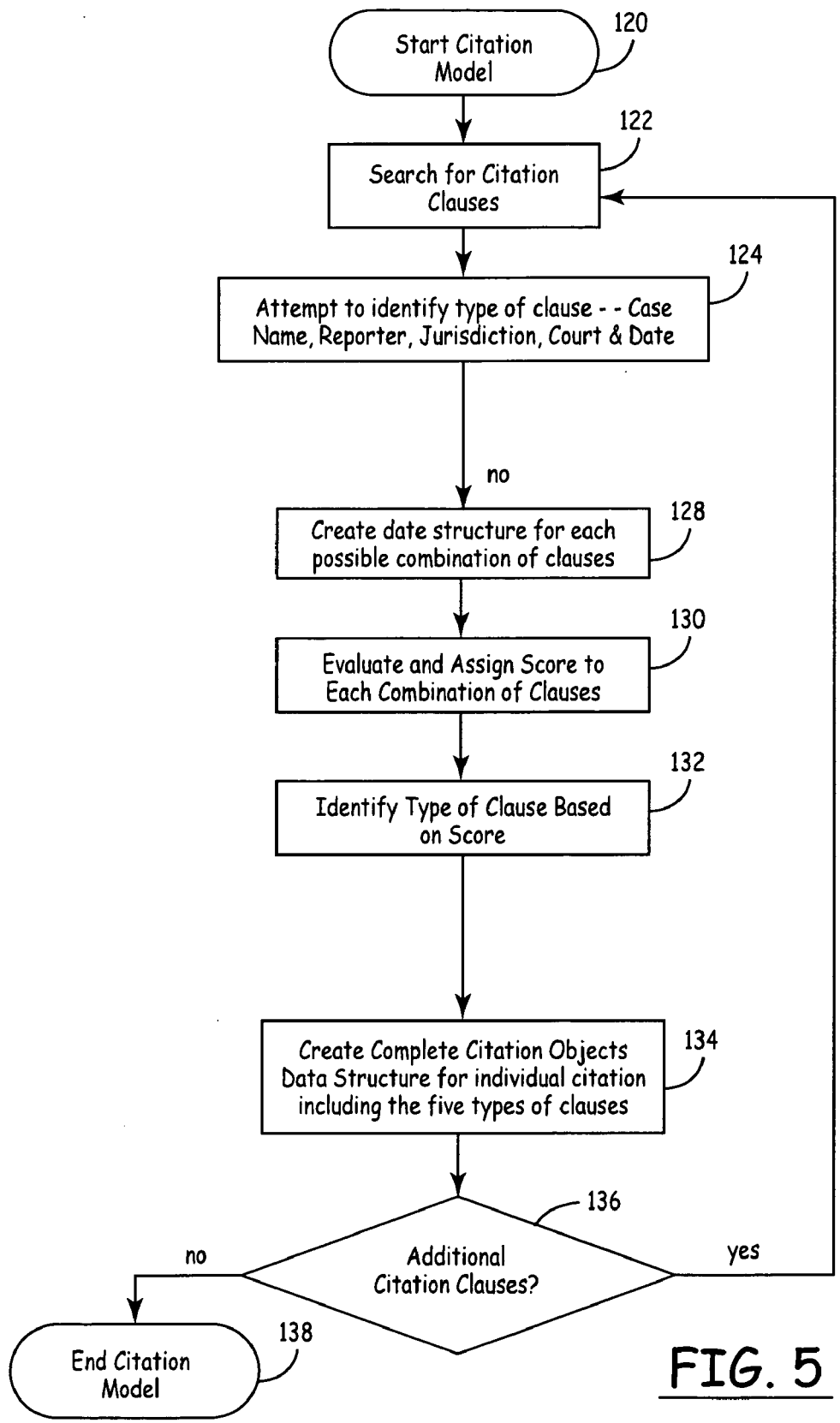
FIG. 5 is flowchart showing the basic operation of the Citation Model component of the legal citation software utility of the present invention.

The Citation Model locates individual "clauses" of a citation by searching for key terms. As it identifies the individual clauses, it assembles them into a Citation Object, a data structure that represents a complete citation. A flowchart depicting the basic operation of the Citation Model is shown in FIG. 5.

Upon start of the Citation Model, per block 120, the Citation Model searches for five types of clauses, per operations block 122: a case name clause that represents the names of the parties to a case, a reporter clause that represents a reporter, including a volume number and page numbers, a jurisdiction clause and a court clause that represents the jurisdiction and court of the deciding court, and a date clause that represents the year or date of the opinion.

A Clause Locator identifies these clauses, per operations block 124, and uses somewhat different techniques to identify the different types of clauses. As an example, consider the following citation:

*Schlemmer v. Farmers Union Cent. Exch.*, 397 N.W.2d 903, 906 (Minn. Ct. App. 1986)

The Clause Locator identifies case name clauses by searching for the start and end of underlined phrases in the word processing documents. Thus, it identifies "Schlemmer v. Farmers Union Cent. Exch." as representing the case name in the above citation.

It identifies reporter clauses, jurisdiction clauses and court clauses by searching for text that resembles a known reporter, jurisdiction or court clause. Specifically, it searches for the beginning of any abbreviations associated with these clauses, using the fuzzy matching techniques described above. The Clause Locator searches for a reporter, jurisdiction or court at each word that consists of letters or numbers, rather than a punctuation mark. It tests a range of phrases that start at that word and continue up to eleven words beyond that, and then words its way through shorter phrases. It ignores, however, phrases that end in a punctuation mark.

At word number 13, for example, it tests the following phrases:

N.W.2d 903, 906 (Minn. Ct
N.W.2d 903, 906 (Minn
N.W.2d 903, 906
N.W.2d 903
N.W.2d
N.W
N It recognizes "N.W.2d" as the abbreviation for North Western Reporter, Second Series, and builds a reporter clause for that phrase. Although it also recognizes "N.W." as the abbreviation for the original North Western Reporter, it does not build a reporter clause representing "N.W.," as "N.W." is contained within the larger phrase "N.W.2d." and "N.W.2d" is followed by a page number.

Finally, the Clause Locator searches for years and dates by looking for single numbers between the range of 1600 and 2010, and for placeholders for years represented by four underscores ("_____"). It also searches for full dates, such as "Aug. 3, 1970," through Visual Basic's™ IsDate function.

Because the Clause Locator simply looks to the text of phrases to identify clauses, it does not distinguish between ambiguous phrases that could represent different types of clauses. For example, the word "Minn." could represent either an abbreviation of Minnesota Reporters, or the jurisdiction for the state of Minnesota. Rather than attempting to resolve this ambiguity, the Clause Locator simply creates two separate clauses for "Minn."—a reporter clause and a jurisdiction clause.

As the Clause Locator identifies clauses, a Citation Builder interprets these clauses to determine whether they actually are part of a larger citation and to resolve any ambiguities, per decision block 126. The broad fuzzy search used by the Clause Locator will identify many "false positives"—phrases that are not parts of citations. For example, the word "Minnesota" or the abbreviation "Minn." may merely be part of a sentence or an address, not a citation. Likewise, the search process identifies every instance of the word "a" as a potential abbreviation for the Atlantic Reporter, which is abbreviated "A."

To determine whether such phrases are part of a citation, and to resolve ambiguities like that caused by the phrase "Minn.," the Citation Builder evaluates the clauses based on their context with other recognized clauses. For each possible combination of clauses in proximity to one another, the Citation Builder creates a data structure, per operations block 128, called a citation object, that represents a complete citation. It then assigns a score, per operations block 130, that represents how closely each citation object comes to a complete and accurate citation. Assuming that any of these combinations have a score above a minimum threshold, it selects the combination with the highest score as representing the best interpretation of the citation, per operations block 132.

In the above example, the Citation Builder begins with the two clauses that it identifies, a case name clause and a reporter clause, and builds a citation object containing only those two clauses. It then builds a citation object that contains additional clauses. To illustrate, it performs the following initial steps, with the name of each clause it identifies in brackets:

Test 1: *Schlemmer v. Farmers Union Cent. Exch.* [Case-Name], 397 N.W.2d 903, 906 [Reporter]

Test 2: *Schlemmer v. Farmers Union Cent. Exch.* [Case-Name: 1.00], 397 N.W.2d 903, 906 [Reporter] (Minn. [Reporter]

Test 3: *Schlemmer v. Farmers Union Cent. Exch.* [Case-Name], 397 N.W.2d 903, 906 [Reporter] (Minn. [Reporter] Ct. App. [Court]

Test 4: *Schlemmer v. Farmers Union Cent. Exch.* [Case-Name], 397 N.W.2d 903, 906 [Reporter] (Minn. [Reporter] Ct. App. [Court] 1986 [Date])

Test 5: *Schlemmer v. Farmers Union Cent. Exch.* [Case-Name], 397 N.W.2d 903, 906 [Reporter] (Minn. [Jurisdiction]

Test 6: *Schlemmer v. Farmers Union Cent. Exch.* [Case-Name], 397 N.W.2d 903, 906 [Reporter] (Minn. [Jurisdiction] Ct. App. [Court]

Test 7: *Schlemmer v. Farmers Union Cent. Exch.* [Case-Name], 397 N.W.2d 903, 906 [Reporter] (Minn. [Jurisdiction] Ct. App. [Court] 1986 [Date])

When the Citation Builder encounters an ambiguous phrase, like "Minn.," it considers alternatives based on each possible interpretation. Thus, in Tests 2–4 it interprets "Minn." as a reporter, while in Tests 5–7 it interprets "Minn." as a jurisdiction.

The Citation Builder determines which tests to perform through an algorithm that treats the individual clauses as nodes of a tree data structure. In the above example, for example, it interprets the case name clause as the top node of the tree, the "N.W.2d" reporter clause as a child node, and the ambiguous "Minn." jurisdiction clause and reporter clause as children of the "N.W.2d" reporter clause. The Citation Builder recursively visits each node of the tree and builds a citation object that composed of the present node and all parent nodes.

As each citation object is constructed, the citation object performs a number of further steps to interpret the citation. First, it identifies the most reasonable interpretation of the citation's jurisdiction and court, based on the citation object's reporter clauses, jurisdiction clauses and court clauses. In the above example, it cannot identify a jurisdiction or court for Test 1 because North Western Reporter does not identify any particular jurisdiction or court, and because there is no jurisdiction clause or court clause. In Tests 2 and 5, it identifies the citation as being to the Minnesota supreme court, because there is a reporter or jurisdiction identifying Minnesota. In Tests 3, 4, 6, and 7, it correctly identifies the citation as being the Minnesota court of appeals, based on the court clause that it identifies.

Second, the citation object identifies volume numbers and page numbers that are associated with any reporter clause. Thus, it recognizes "397" as the volume number for "N.W.2d," and "903, 906" as its page numbers.

Third, the citation object locates the ending punctuation that follows the last clause. Thus, in Test 7, for example, it correctly includes the close parenthesis mark to complete the "(Minn. Ct. App. 1986" parenthetical phrase.

Fourth, the citation object calculates a score that represents how closely its constituent clauses come to a complete and accurate citation. This consists of several sub-processes.

First, each clause is assigned a score between 0 and 1 based on how closely it appears to be complete, accurate, and in the correct relationship to other clauses. In the following example, which expands on the earlier example, the score for each clause is indicated within the brackets:

Test 1: *Schlemmer v. Farmers Union Cent. Exch.* [Case-Name: 1.00], 397 N.W.2d 903, 906 [Reporter: 0.93]

Test 2: *Schlemmer v. Farmers Union Cent. Exch.* [Case-Name: 1.00], 397 N.W.2d 903, 906 [Reporter: 1.00] (Minn. [Reporter: 0.22]

Test 3: *Schlemmer v. Farmers Union Cent. Exch.* [Case-Name: 1.00], 397 N.W.2d 903, 906 [Reporter: 1.00] (Minn. [Reporter: 0.29] Ct. App. [Court: 0.63]

Test 4: *Schlemmer v. Farmers Union Cent. Exch.* [Case-Name: 1.00], 397 N.W.2d 903, 906 [Reporter: 1.00] (Minn. [Reporter: 0.29] Ct. App. [Court: 0.93] 1986 [Date: 1.00])

Test 5: *Schlemmer v. Farmers Union Cent. Exch.* [Case-Name: 1.00], 397 N.W.2d 903, 906 [Reporter: 1.00] (Minn. [Jurisdiction: 0.70]

Test 6: *Schlemmer v. Farmers Union Cent. Exch.* [Case-Name: 1.00], 397 N.W.2d 903, 906 [Reporter: 1.00] (Minn. [Jurisdiction: 1.00] Ct. App. [Court: 0.70]

Test 7: *Schlemmer v. Farmers Union Cent. Exch.* [Case-Name: 1.00], 397 N.W.2d 903, 906 [Reporter: 1.00] (Minn. [Jurisdiction: 1.00] Ct. App. [Court: 1.00] 1986 [Date: 1.00])

In Test 1, the reporter clause has a lower score because it is not followed by a jurisdiction clause, court clause or date clause, as would be expected. In Tests 2–4, the "Minn." reporter clause receives a low score because it does not have a volume number or page numbers, and because there is no comma between it and the preceding reporter clause and no open parenthesis mark between it and the following court clause—the punctuation that would be expected if "Minn." were actually a reporter. In Test 3, the court clause receives a lower score in part because there is no open parenthesis mark between it and the preceding reporter clause. In Tests 2, 3, 5, and 6, the trailing jurisdiction and court clauses have lower scores because they are not followed by a date clause or a close parenthesis mark.

After each clause is assigned its own score, the citation object assigns a total score for the citation, based on the completeness of the citation and the individual scores of the clauses. The score is assigned as follows:

If a case name clause is present, add 100 points times the score of that clause.

If one or more reporter clauses are present, add 150 points times the average score of those clauses.

If a date clause is present, add 100 points times the score of that clause.

If a jurisdiction could be determined, add 100 points times the score of the clause (jurisdiction clause, court clause or reporter clause) that identifies it.

If a court could be determined, add 50 points times the score of the clause jurisdiction clause, court clause or reporter clause) that identifies it.

Subtract 50 points if there is more than one case name clause, court clause or jurisdiction clause.

Subtract 50 points if there is more than one reporter clause and the clauses are not contiguous to each other.

Subtract 10 points for each word that is not recognized, excluding punctuation.

Based on these calculations, the citation objects assigns the following total scores:

Test 1: 239
Test 2: 224
Test 3: 256
Test 4: 371
Test 5: 355
Test 6: 385
Test 7: 500

Because Test 7 receives a perfect score of 500, the Citation Builder identifies that interpretation of the clauses as being the correct interpretation. Of course, other methods of scoring may be used without departing from the spirit or scope of the invention.

When the Citation Builder does not encounter a citation with a perfect score, it tests further combinations, by excluding earlier clauses, to ensure that it has not misinterpreted the citation. If, for example, the citation had been incorrectly formatted as:

Schlemmer v. Farmers Union Cent. Exch., Minn. Ct. App., 397 N.W.2d 903, 906 (1986)

then no possibility would have a perfect score, as jurisdiction clause and court clause are placed in an incorrect position. Consequently, the Citation Builder performs a deeper search in which some earlier clauses (parent nodes) are discarded, with the following result:

Test 1: *Schlemmer v. Farmers Union Cent. Exch.* [Case-Name: 1.00], Minn. [Reporter: 0.29] Jurisdiction: Minnesota; Court: Minnesota Supreme Court; Score: 186

Test 2: *Schlemmer v. Farmers Union Cent. Exch.* [Case-Name: 1.00], Minn. [Reporter: 0.37] Ct. App. [Court: 0.63], 397 Jurisdiction: Minnesota; Court: Minnesota Court of Appeals; Score: 213

Test 3: *Schlemmer v. Farmers Union Cent. Exch.* [Case-Name: 1.00], Minn. [Reporter: 0.37] Ct. App. [Court: 0.63], 397 N.W.2d 903, 906 [Reporter: 0.85] ( Jurisdiction: Minnesota; Court: Minnesota Court of Appeals; Score: 210

Test 4: *Schlemmer v. Farmers Union Cent. Exch.* [Case-Name: 1.00], Minn. [Reporter: 0.37] Ct. App. [Court: 0.63], 397 N.W.2d 903, 906 [Reporter: 0.93] (1986 [Date: 1.00]) Jurisdiction: Minnesota; Court: Minnesota Court of Appeals; Score: 315

Test 5: *Schlemmer v. Farmers Union Cent. Exch.* [Case-Name: 0.75], Minn. [Jurisdiction: 0.48] Jurisdiction: Minnesota; Court: Minnesota Supreme Court; Score: 146

Test 6: *Schlemmer v. Farmers Union Cent. Exch.* [Case-Name: 0.75], Minn. [Jurisdiction: 0.78] Ct. App. [Court: 0.70], 397 Jurisdiction: Minnesota; Court: Minnesota Court of Appeals; Score: 177

Test 7: *Schlemmer v. Farmers Union Cent. Exch.* [Case-Name: 0.75], Minn. [Jurisdiction: 0.78] Ct. App. [Court: 0.70], 397 N.W.2d 903, 906 [Reporter: 0.85] ( Jurisdiction: Minnesota; Court: Minnesota Court of Appeals; Score: 315

Test 8: *Schlemmer v. Farmers Union Cent. Exch.* [Case-Name: 0.75], Minn. [Jurisdiction: 0.78] Ct. App. [Court: 0.70], 397 N.W.2d 903, 906 [Reporter: 0.93] (1986 [Date: 1.00]) Jurisdiction: Minnesota; Court: Minnesota Court of Appeals; Score: 426

Test 9: Minn. [Reporter: 0.29] Ct. App. [Court: 0.63], 397 Jurisdiction: Minnesota; Court: Minnesota Court of Appeals; Score: 93

Test 10: Minn. [Jurisdiction: 0.70] Ct. App. [Court: 0.70], 397 Jurisdiction: Minnesota; Court: Minnesota Court of Appeals; Score: 95

Test 11: Ct. App. [Court: 0.40], 397 N.W.2d 903, 906 [Reporter: 0.85] ( Jurisdiction: none; Court: none; Score: 168

Test 12: Ct. App. [Court: 0.40], 397 N.W.2d 903, 906 [Reporter: 0.93] (1986 [Date: 1.00]) Jurisdiction: none; Court: none; Score: 279

Test 13: N.W.2d 903, 906 [Reporter: 0.93] (1986 [Date: 1.00]) Jurisdiction: none; Court: none; Score: 239

After each test is complete, it recognizes Test 8 as being the citation with the highest score, and thus the best interpretation of the citation.

If an imperfect citation is followed by another citation, the Citation Builder performs an even more thorough test. Consider the following example:

*Schlemmer v. Farmers Union Cent. Exch.*, Minn. Ct. App., 397 N.W.2d 903, 906 (1986); *Khalifa v. State*, Minn. Ct. App., 397 N.W.2d 383, 387 (1986)

The Citation Builder tests 32 different interpretations of the Schlemmer citation, including interpretations that include elements of the Khalifa citation, to ensure that it has considered every possibility. However, it concludes that the interpretation described in Test 8, above, remains the best interpretation.

Certain citations, like the hypothetical citation "*Jones v. Smith*, 68 U.S. (1 Wall.) 100, 105 (1863)," contain parenthetical identifications of the reporter's editor (here, to Wallace.) These citations can also be written, incorrectly, as "*Jones v. Smith*, 68 U.S. 100, 105 (1863)" or "*Jones v. Smith*, 1 Wall. 100, 105 (1863)." Consequently, the phrase "Wall.," by itself, does not identify whether the phrase is used as parenthetical identification of the editor or as a full reporter. The Clause Locator simply identifies it as a reporter clause.

When a citation object is built where one reporter clause follows another, as "1 Wall." follows "68 U.S., the citation object assigns a score to determine how closely the second clause appears like an editor parenthetical. If the score is sufficiently high, the citation object builds an editor clause that contains the editor phrase. The editor clause is then assigned as a part of the main reporter clause. Thus, in "*Jones v. Smith*, 68 U.S. (1 Wall.) 100, 105 (1863)," the reporter clause consists of the entire "68 U.S. (1 Wall.) 100, 105," with a subsidiary editor clause that represents "1 Wall."

Upon identifying or establishing the type of clause within each citation, a complete citation object for the citation (containing all five types of clauses) is created, per operations block 134. The Citation Model then determines if additional citation clauses are present, per decision block 136, and repeats the above-described process to identify the types of clauses within each citation. If no additional citation clauses are present, the operation of the citation model is terminated.

II.D. Check Modules

After the Citation Model identifies each individual citation, it passes its citation object to a series of modules called, collectively, the Check Modules. Each check module performs a series of related tests on the citation object to attempt to identify Bluebook stylistic errors.

After a citation has been parsed by the Citation Model, the resulting citation object can be used to identify information, or "properties," about each specific clause. Because the citation object is built through object-oriented techniques, which each clause represented as a separate object, these properties can be accessed with relative simplicity.

For example, if the citation object has a date clause that identifies the year, the year can be accessed through the code:

Var=Citation.Year

This code sets the variable Var to a number representing the year. Likewise, the text of the various clauses can be accessed through commands like:

Var=Citation.CourtClause.Text
Var=Citation.ReporterClauses(2).Text

The first sets Var to the text of the citation object's court clause, while the second sets Var to the text of the citation object's second reporter clause.

The reporter clauses, court clauses and jurisdiction clauses also have data representing the reporter object, court object, and jurisdiction object "associated" with the clause. For example, the following code sets Var to the correct abbreviation for the citation object's second reporter clause:

Var=Citation.ReporterClauses(2).AssociatedReporter. AbrvName

The check modules access these properties of the citation to look for anticipated errors. For example, the following code checks whether a reporter clause's abbreviation is the correct abbreviation for that clause:

If Citation.ReporterClause(1).AbrvText <> Citation.AssociatedReporter.AbrvName Then . . .

Translated, this code asks a question: "Is the abbreviation used by the first reporter clause different from the correct abbreviation for the reporter object associated with this clause?" If the reporter clause consisted of "100 Nw2d 105, 110," the abbreviation would be "Nw2d." However, the correct abbreviation for the associated reporter object, representing North Western Reporter, Second Series, would be "N.W.2d." Since the two phrases are not identical, the "if . . . then" statement would identify an error.

Likewise, the following code tests whether the date appears to be correct:

If Citation.Year<Citation.Court.YearStart_ or Citation.Year>Citation.Court.YearEnd Then . . .

Translated, this code asks "Is the year in the date clause earlier than first valid year for the citation's court, or later than the last valid year (if any) for this court?" If the citation were "*Jones v. Smith,* 100 N.W.2d 105, 110 (Minn. Ct. App. 1970)," this question would identify an error: The Minnesota Court of Appeals did not begin operating until 1983, as represented by Table T.1 of the Bluebook, so 1970 is an invalid year. The court object for the Minnesota Court of Appeals contains a property, YearStart, that represents the year the court began operating. Because the citation's year property (1970) is less than the YearStart property for the Minnesota Court of Appeals object (1983), this "if . . . then" statement would identify the error.

The Check Modules perform a series of similar tests to identify errors. Each check module is subdivided into a number of procedures that each perform one or several specific tests.

When one of the check procedures identifies an error, it calls a subroutine that instructs the Error Form to display an error. In most situations, the check procedure will also instruct the Error Form to suggest one or more specific changes. For example, the code associated with the first example instructs the Error Form to suggest changing "Nw2d" to "N.W.2d." Likewise, the code associated with the second example instructs the error form to suggest changing "1970" to a placeholder representing the year ("_____").

Other check procedures may generate multiple suggestions. For example, a citation might not identify the jurisdiction of the deciding court, which can be tested through the code:

If Citation.Jurisdiction is Nothing Then

If this error is found, the check procedure for this test generates a list of jurisdiction objects that are most compatible with the citation's court clause, reporter clause or clauses, and the citation's date. For each compatible jurisdiction, the check procedure suggests inserting a jurisdiction clause that identifies the jurisdiction. If, for example, the citation is "*Jones v. Smith,* 100 N.W.2d 105, 110 (Ct. App. 1990)," the check procedure will recognize that the jurisdiction is missing and suggest inserting "Iowa," Mich.," "Minn.," and other jurisdictions that use the reporter N.W.2d and have courts of appeals.

Following is a listing of check procedures that are preferably implemented within the Check Modules component of the legal citation software utility 20 and the preferred suggestions for correction:

Checkcasename

If the case name's designation of "versus" is not spelled as "v.," then suggest changing it to "v."

If the case name's "v." is not followed by a space, then suggest inserting a space.

If the case name has more than one designation of "versus," then suggest deleting the parties to the second case name.

If the case name contains the phrase "et al." or "d/b/a", then suggest deleting that phrase and the remaining text in that party's name.

If the case name contains the phrases "on . . . of" or "for . . . of," then suggest changing that phrase to "ex rel."

If the case name contains the phrase "by and through," then suggest changing that phrase to "ex rel."

If the first word of the case name is "in," "petition," or "application" and that word is followed by "of," then suggest changing the phrase to "In re."

If the case name begins with "In re" or "Ex parte," but also contains a designation of "versus," then suggest deleting the "In re" or "Ex parte" procedural phrase.

If "ex rel." follows a designation of "In re" or "Ex parte," then suggest deleting "ex rel." and the remainder of the case name.

If "In re" or "Ex parte" is incorrectly punctuated or capitalized, then suggest correcting it. If "ex rel." is incorrectly punctuated or capitalized, then suggest correcting it.

If the first word of a party name is abbreviated, then suggest changing it to its unabbreviated phrase.

If the first word of a party name is "The," and it is not part of the phrases "The King," "The Queen," or "The . . . case(s)," then suggest deleting it.

If the name of a party ends in a word that describes a party, like "administrator," "appellee," or "executor," then suggest deleting that word.

If the case name contains "State of [State]", "Commonwealth of [State]" or "People of [State]", and "[state]" is the jurisdiction of the citation, then suggest deleting "of [state]."

If the case name contains "State of [State]", "Commonwealth of [State]" or "People of [State]", and "[state]" is the jurisdiction of the citation, then suggest deleting "State of," "Commonwealth," or "People of."

If one party's name is simply "State," "Commonwealth," or "People," but the citation has a federal jurisdiction, then ask the user to change that party's name to the name of the state.

If one party's name consists only of the name of a state, and that state is the same as the citation's jurisdiction, then suggest changing the name of the state to "State," "Commonwealth," or "People."

If the name contains "City of," "Town of," "Township of," "Borough of," or "County of" and that phrase is not the first word of a party name, then suggest deleting the phrase.

If a party's name contains "of," and the word "of" is not the first or second word in the party's name, then suggest deleting it if it is a prepositional phrase of location.

If the case name contains "United States of America," suggest deleting "of America."

If a party's name has more than one phrase that designates the party as being a business entity, then suggest deleting the later phrase.

If a party's name has a word indicating a union designation, then suggest that the user consult Rule 10.2.1(i) to ensure that it complies with that rule.

If a party's name starts with "C.I.R." or "Commissioner of Internal Revenue," then suggest changing the phrase to "Commissioner."

If one party's name contains a full word from Table 6 or 10, or the full name of a jurisdiction, and the word is not the first word of a party's name, then suggest replacing the word with its abbreviation.

If "United States" is abbreviated, suggest changing it to "United States."

Checkreporter

If a reporter abbreviation is not punctuated or spelled correctly, then suggest changing it to the correct abbreviation.

If a reporter clause is missing a volume number, and the correct volume number is implicit in the volume number of an editor, then suggest inserting the correct volume number.

If a reporter clause is missing a volume number, and the correct volume number is not implicit in the volume number of an editor, then suggest inserting a placeholder for the volume number.

If the volume number of a reporter is outside of the allowed range of volume numbers for this reporter, then suggest changing the volume number to a placeholder.

If a reporter clause is missing the first page number, then suggest inserting a placeholder.

If there is no punctuation between the first page number and a pinpoint page number, then suggest inserting a comma.

If the punctuation between the first page number and a pinpoint page number is not a single comma, then suggest changing the punctuation to a comma.

If a reporter clause is missing a pinpoint page number is missing, then suggest inserting a placeholder for the pinpoint page number.

If the citation's year is compatible with the designated court but is outside the range of valid years for a reporter, then suggest either changing it to a placeholder or having the user edit the date to correct it.

Checkeditor

If the reporter clause should have an editor, but does not have one, then suggest inserting an editor parenthetical.

If the current reporter clause has an editor that is not used for this main reporter, and the main reporter should have a different editor, then suggest changing the editor to the correct one.

If the current reporter clause has an editor that is not used for this main reporter, and the main reporter should not have an editor, then suggest deleting the editor clause.

If an editor should have a volume number, but is missing a volume number, then suggest inserting the correct volume number.

If an editor should not have a volume number, but does have one, then suggest deleting that volume number.

If the volume number for an editor does not correspond with the volume number for the main reporter, then suggest changing the editor's volume number to the correct volume number.

If the an editor is not punctuated or spelled correctly, then suggest changing it to the correct abbreviation.

If the citation does not have a designation of an editor's main reporter, then suggest changing the editor clause to a parenthetical of the correct main reporter or adding a citation to the main reporter as a parallel citation.

If the citation has a main reporter clause and a separate reporter clause with an editor, but the editor's pagination is the same as the main reporter clause, then suggest changing the editor reporter clause to a parenthetical of the main clause.

Checkjurandcourt

If the citation does not have a jurisdiction clause or a reporter clause that identifies the jurisdiction, but does have a court clause, then suggest adding a jurisdiction clause for each jurisdiction that best matches the reporters, date and court clause.

If the citation does not have a jurisdiction clause or a reporter clause that identifies the jurisdiction, and does not have a court clause, then suggest adding a jurisdiction clause for each jurisdiction that best matches the reporters and date.

If the citation does not have a court clause or reporter clause that identifies the court, but does have a jurisdiction clause or reporter clause that identifies the jurisdiction, then suggest adding a court clause for every court that best matches the reporters and date.

If the citation has a jurisdiction clause that is not compatible with the court clause, then suggest either changing the jurisdiction clause to one that matches the court or changing the court clause to one that matches the jurisdiction.

If the citation has a federal jurisdiction clause that is redundant because the jurisdiction is identified a federal court clause, then suggest deleting the jurisdiction clause.

If the citation has a state jurisdiction clause that follows a federal court clause, then suggest deleting the jurisdiction clause.

If the citation has a state jurisdiction clause that is redundant because that state is identified by a state court clause, then suggest deleting the jurisdiction clause.

If both the jurisdiction clause and court clause are redundant because the jurisdiction and court are identified by a reporter, then suggest deleting them together.

If the jurisdiction clause is redundant because the jurisdiction is identified by a reporter, but there is no court clause or the court clause is not redundant, then suggest deleting only the jurisdiction clause.

If the court clause is redundant because the court is identified by a reporter, but there is no jurisdiction clause, then suggest deleting the court clause.

If a court clause follows a jurisdiction clause and either or both is incorrectly abbreviated, then suggest changing them as a single unit to the correct abbreviation.

If the jurisdiction clause is incorrectly abbreviated, then suggest changing it to the correct abbreviation.

If the court clause is incorrectly abbreviated, then suggest changing it to the correct abbreviation.

If the citation's year is not within a valid range for the designated court, then suggest changing the year to a placeholder or ask the user to correct the year manually.

Checkparallelreporters

If the citation has a reporter clause that is not used by the citation's court, but at least one other reporter clause that is valid for the court, then suggest deleting the invalid reporter clause.

If the citation has a reporter clause that is not used by the citation's court, and has no other reporter clauses, then suggest replacing the invalid reporter clause with a reporter that is used by the court.

If the citation has two reporters that are of the same type, then suggest deleting either one of them.

If the citation has parallel reporters but should not use parallel reporters, then suggest deleting the unnecessary reporter.

If there are two or more reporter clauses and they are not in the correct order, then suggest moving one to its correct position.

If the citation has a citation to one reporter, but it is not the best reporter for this court, then suggest replacing the disfavored reporter with a preferred reporter.

If the citation does not have any reporter clauses, then suggest inserting one that is valid for this court.

If the citation should use parallel reporters, but is missing a reporter that is necessary for this court, then suggest inserting the missing reporter.

Checkdate

If the citation contains a full date in the format of "month date, year," but the month is not spelled with the correct abbreviation, then suggest replacing the month with the correct abbreviation.

If the citation contains a full date but in an incorrect format, then suggest replacing it with the same date in the proper "month date, year" format.

If the citation does not contain a date clause, then suggest that inserting a placeholder.

Checkclauseorder

If the reporter clauses do not follow the case name clause, then suggest moving the reporter clauses to the position following the case name.

If the jurisdiction clause and court clause are adjacent, and they do not follow the last reporter clause, then suggest moving them together to the position following the last reporter clause.

If the jurisdiction clause does not follow the last reporter clause, then suggest moving it to the position following the last reporter clause.

If the court clause and date clause are adjacent and do not follow the jurisdiction clause or the last reporter clause, then suggest moving them to the position following the jurisdiction clause or the last reporter clause.

If the court clause does not follow the jurisdiction clause or last reporter clause, then suggest moving it to the position following the jurisdiction clause or last reporter clause.

If the date clause does not follow the court clause, jurisdiction clause or last reporter clause, then suggest moving it to the position following the court clause, jurisdiction clause or last reporter clause.

II.E. Error Form

The Error Form is a set of code that displays errors and suggestions identified by the Check Modules. While the invention is parsing citations and checking citations, it displays a blank dialog box, i.e., Error Form box 48, to indicate that the software utility 20 is running. When a specific check procedure identifies an error, however, it instructs the Error Form to display that particular error in the Error Form box 48, see FIGS. 3C, 3D and 3E.

Each test performed by the Check Modules has a specific identifier, or "key." When a check procedure finds an error, it passes that key to the Error Form, plus numbers that represent the words of the citation that contain the error. The Error Form uses this information to display the citation 50 in the Current Citation window, with the error highlighted in red, and to display a message 56 explaining the perceived problem.

In addition, the Error Form can display the appropriate text from the Bluebook relating to this error. The user can view this text by selecting the "Show Rule" checkbox 66, or can hide this text, to reduce the size of the dialog box, by clicking again to de-select the checkbox 66.

The Error Form also contains code to display specific suggestions 56 identified by the check procedure. If a suggestion 56 is identified, the Error Form uses a "hidden" word processing document, one that is not visible to the user, to make the edits suggested by the check procedure. It then displays this corrected citation in the Suggestion window. In some instances, several different suggestions 56 are requested by the check procedure. When this occurs, the Error Form displays a list of citations, each containing a different suggested change, and allows the user to select the correct one by clicking on that citation, see FIG. 3E.

After displaying an error, the Error Form activates two buttons: Ignore 60 and Ignore Rule 62. If one suggestion was generated, or if multiple suggestions were generated and the user has selected a specific suggestion, it also activates the Change button 58. It then waits for the user to respond. If the user presses Ignore 60, the Error Form makes no change to the word processing document and returns control to the Check Modules to perform other tests. If the user presses "Ignore Rule" 62, the Error Form makes no changes and will ignore all other errors that share the same error key. If the user presses "Change" 58, the Error Form changes the text of the citation in the main word processing document 52 to the text of the suggested citation 56. The invention then resumes locating, parsing and checking citations.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed:

1. A legal citation checker comprising a computer-readable medium encoded with a computer program, wherein said computer program comprises:

a first component that enables the legal citation checker to operate as a plug-in to a word processing application; and a second component, operable with the first component, that operates to locate a legal case citation within an open word processing document, wherein said second component operates to identify an error within the legal case citation as compared against a legal case citation standard and automatically correct the legal case citation within said open word processing document in conformance with the legal case citation standard.

2. The legal citation checker of claim 1, wherein said first component and said second component are unitary.

3. A legal citation checker comprising a computer-readable medium encoded with a computer program, wherein said computer program operates as a plug-in application to a word processing application, wherein the legal citation checker operates according to a method comprising locating a legal case citation within an open word processing document, identifying an error within the legal case citation within the open word processing document as compared against a legal case citation standard and automatically correcting the error within the legal case citation within the open word processing document according to the legal case citation standard.

4. A method of operation of a legal citation checker with an open word processing document that is being edited by a word processing application, said method comprising the steps of:
  locating a legal case citation within said open word processing document;
  identifying an error within a legal case citation within said open word processing document as compared against a legal case citation standard;
  displaying said error within a window or dialog box displayed simultaneously with said open word processing document; and
  automatically correcting said error within said legal case citation within said open document according to said predetermined legal case citation standard.

5. The method of claim 4, further comprising highlighting said error.

6. The method of claim 4, further comprising offering a selection of a type of said open word processing document, wherein said selection of said type is displayed in a window or dialog box displayed simultaneously with said open word processing document.

7. The method of claim 4, further comprising displaying a suggestion for correction of said error within a window or dialog box displayed simultaneously with said open word processing document.

8. The method of claim 7, further comprising offering an interactive acceptance or denial of said suggestion.

9. The method of claim 8, further comprising correcting said error within said legal case citation within said open word processing document upon acceptance of said suggestion.

10. The method of claim 4, further comprising displaying a legal case citation standard that is relevant to said error in a window or dialog box displayed simultaneously with said open word processing document.

11. A legal citation checker, comprising:
  a computer-readable medium encoded with a computer program, wherein said computer program includes:
  means for interfacing with an existing word processing application; and
  means for operating with said means for interfacing, said means for operating also for locating a legal case citation within an open word processing document that is being edited and for identifying an error within said legal case citation as compared against a predetermined case citation standard, and wherein said means for operating also for automatically correcting said error within said legal case citation within said open word processing document according to said predetermined legal case citation standard.

12. The legal citation checker of claim 11, wherein said means for interfacing and said means for operating are unitary.

13. The legal citation checker of claim 11, wherein said means for operating locates automatically said legal case citation.

14. The legal citation checker of claim 11, wherein said means for operating parses said legal case citation into a plurality of constituent elements.

15. The legal citation checker of claim 11, wherein said means for operating provides an error message as to the identified error.

16. The legal citation checker of claim 11, wherein said means for operating offers a suggestion as to the correction of the identified error.

17. The legal citation checker of claim 16, wherein said means for operating enables a user to accept or ignore said suggestion.

18. The legal citation checker of claim 11, wherein said means for operating provides said predetermined legal case citation standard that is relevant to the identified error.

19. The legal citation checker of claim 11, wherein said predetermined legal case citation standard comprises the Bluebook.

20. The legal citation checker of claim 11, wherein said means for operating adjusts said identification of said error according to a type of said open word processing document.

21. The legal citation checker of claim 20, wherein said type of said open word processing document is selected from a group consisting of: a state court document, a federal court document, and a non-court document.

22. The legal citation checker of claim 11, further comprising means for storing an element relevant to said legal citation checker, wherein said element is selected from a group consisting of: said means for interfacing, said means for operating, means for instructing on the operation of said means for interfacing, and means for instructing on the operation of said means for operating.

23. A method of locating and correcting a legal case citation in an open document that is being edited by a word processing application, comprising the steps of:
  automatically scanning said open document for said legal case citation;
  locating said legal case citation within said open document;
  identifying an error within said legal case citation as compared against a predetermined legal case citation standard; and
  automatically correcting said error within said legal case citation within said open document according to said predetermined legal case citation standard.

24. The method of claim 23, wherein said step of locating includes locating an ambiguous case citation and resolving the ambiguity of said ambiguous case citation.

25. The method of claim 23, further comprising the step of parsing said legal case citation into a plurality of constituent elements.

26. The method of claim 25, further comprising the step of identifying said plurality of constituent elements through a procedure selected from a group consisting of: a fuzzy logic procedure, a fuzzy pattern matching procedure, a scoring procedure, and a ranking procedure.

27. The method of claim 23, further comprising the step of providing an error message as to the identified error.

28. The method of claim 23, further comprising the step of providing a suggestion as to a correction for the identified error.

29. The method of claim 23, further comprising the step of providing said legal case citation standard that is relevant to the identified error.

30. The method of claim 23, wherein said legal case citation standard is established by the Bluebook.

31. The method of claim 23, further comprising adjusting the step of identifying an error within said legal case citation according to a type of said open document.

32. The method of claim 31, wherein said type of open document is selected from a group consisting of: a state court document, a federal court document, and a non-court document.

33. A legal citation checker for verifying the stylistic accuracy of a legal case citation within an open word processing document within a word processing application, said legal citation checker comprising:
   a computer-readable medium encoded with a computer program, wherein said computer program includes:
      an integration component, wherein said integration component interfaces with said word processing application;
      a data structure component operable with said integration component, wherein said data structure component provides a plurality of stylistic accuracy rules for a plurality of legal jurisdictions;
      a scanning component operable with said data structure component, wherein said scanning component scans said open word processing document to locate a legal case citation;
      a testing component operable with said scanning component, wherein said testing component tests said located legal case citation for errors in stylistic accuracy as compared against said rules ; and
      an error component operable with said testing component, wherein said error component automatically corrects said error in stylistic accuracy within said open word processing document.

34. The legal citation checker of claim 33, wherein said integration component, said data structure component, said scanning component, said testing component, and said error component are of a configuration selected from a group consisting of: a unitary component configuration, a partial unitary component configuration, and an individual component configuration.

35. The legal citation checker of claim 33, wherein said scanning component parses the located legal citation into a plurality of constituent elements.

36. The legal citation checker of claim 33, wherein said error component displays said detected error in stylistic accuracy.

37. The legal citation checker of claim 33, wherein said error component provides a suggestion for a correction of said detected error in stylistic accuracy.

38. The legal citation checker of claim 37, wherein said error component enables a user to accept or ignore said suggestion.

39. A legal citation checker, comprising:
   a computer-readable medium encoded with a computer program, wherein said computer program includes:
      a software interface that interfaces with an existing word processing application; and
      a software component operable with said software interface and executable with said word processing application, wherein said software component functions to locate a legal case citation within a word processing document and to identify an error within said legal case citation within said word processing document as compared against a predetermined legal case citation standard, wherein said software component functions to automatically correct said error within said legal case citation within said word processing document according to said predetermined legal case citation standard.

40. The legal citation checker of claim 39, wherein said software interface and said software component are unitary.

41. The legal citation checker of claim 39, wherein said software component functions to locate automatically said legal case citation within said word processing document.

42. The legal citation checker of claim 39, wherein said software component further functions to parse said legal case citation into a plurality of constituent elements.

43. The legal citation checker of claim 42, wherein said plurality of constituent elements are identified through a procedure selected from a group consisting of: a fuzzy logic procedure, a fuzzy pattern matching procedure, a scoring procedure, and a ranking procedure.

44. The legal citation checker of claim 39, wherein said software component further functions to provide an error message as to the identified error.

45. The legal citation checker of claim 39, wherein said software component further functions to offer a suggestion as to correction of the identified error.

46. The legal citation checker of claim 45, wherein said software component further functions to enable a user to accept or ignore said suggestion.

47. The legal citation checker of claim 39, wherein said software component further functions to display said legal case citation standard that is relevant to the identified error.

48. The legal citation checker of claim 39, wherein said legal case citation standard comprises the Bluebook.

49. The legal citation checker of claim 39, wherein said software component adjusts its identification of said error according to a type of said word processing document.

50. The legal citation checker of claim 49, wherein said type of word processing document is selected from a group consisting of: a state court document, a federal court document, and a non-court document.

51. The legal citation checker of claim 39, further comprising a storage medium containing elements selected from a group consisting of: said software interface, said software component, an instruction relevant to said software interface, and an instruction relevant to said software component.

52. The legal citation checker of claim 39, wherein said software component functions to locate an ambiguous legal case citation and resolve the ambiguity of said ambiguous legal case citation.

\* \* \* \* \*